United States Patent
Abbas

(10) Patent No.: US 11,373,105 B2
(45) Date of Patent: Jun. 28, 2022

(54) AUTONOMOUS ARTIFICIALLY INTELLIGENT SYSTEM TO PREDICT PIPE LEAKS

(71) Applicant: Oracle International Corporation, Redwood Shores, CA (US)

(72) Inventor: Hussain Abbas, San Francisco, CA (US)

(73) Assignee: Oracle International Corporation, Redwood Shores, CA (US)

(*) Notice: Subject to any disclaimer, the term of this patent is extended or adjusted under 35 U.S.C. 154(b) by 874 days.

(21) Appl. No.: 15/820,316

(22) Filed: Nov. 21, 2017

(65) Prior Publication Data

US 2018/0300639 A1 Oct. 18, 2018

Related U.S. Application Data

(60) Provisional application No. 62/485,314, filed on Apr. 13, 2017.

(51) Int. Cl.
  *G06N 5/04* (2006.01)
  *G06N 7/00* (2006.01)
  (Continued)

(52) U.S. Cl.
  CPC ............ *G06N 5/04* (2013.01); *G06N 7/005* (2013.01); *G06N 20/00* (2019.01); *G06N 20/20* (2019.01); *G06Q 10/04* (2013.01); *G06Q 50/06* (2013.01)

(58) Field of Classification Search
  None
  See application file for complete search history.

(56) References Cited

U.S. PATENT DOCUMENTS

2017/0102678 A1* 4/2017 Nixon ................ G05B 19/4185

FOREIGN PATENT DOCUMENTS

EP 3112959 A1 * 1/2017 ............ G05B 13/04
JP 2011198267 10/2011
JP 2012014619 1/2012

OTHER PUBLICATIONS

Rui Wang, Weishan Dong, Yu Wang, Ke Tang, and Xin Yao. Pipe Failure Prediction: A Data Mining Method. 2013. IEEE (Year: 2013).*

(Continued)

*Primary Examiner* — Brian M Smith
*Assistant Examiner* — Qamar Iqbal
(74) *Attorney, Agent, or Firm* — Kilpatrick Townsend & Stockton LLP

(57) ABSTRACT

Embodiments of the disclosure are directed towards pipe leak prediction systems configured to predict whether a pipe (e.g., a utility pipe carrying some substance such as waster) is likely to leak. The pipe leak prediction system may include one or more predictive models based on one or more machine learning techniques, and a predictive model can be trained using data for the characteristics of various pipes in order to determine the patterns associated with pipes without leaks and the patterns associated with pipes with leaks. A predictive model can be validated, used to construct a confusion matrix, and used to generate insights and inferences associated with the determinant variables used to make the predictions. The predictive model can be applied to data for various pipes in order to predict which of those pipes will leak. Any pipes that are identified as likely to leak can be assigned for further investigation for potential repair or preventative maintenance.

20 Claims, 15 Drawing Sheets

(51) Int. Cl.
*G06N 20/00* (2019.01)
*G06Q 50/06* (2012.01)
*G06Q 10/04* (2012.01)
*G06N 20/20* (2019.01)

(56) References Cited

OTHER PUBLICATIONS

Viv Bewick, Liz Cheek, and Jonathan Ball. Statistics review 13: Receiver operating characteristic curves. Dec. 2004. Critical Care 2004, 8:508-512 (DOI 10.1186/cc3000) (Year: 2004).*
S. R. Mounce; J. B. Boxall; and J. Machell. Development and Verification of an Online Artificial Intelligence System for Detection of Bursts and Other Abnormal Flows. 2010. Journal of Water Resources Planning and Management (Year: 2010).*
Abdulla, et al. "Pipeline Leak Detection Using Artificial Neural Network: Experimental Study", 5th International Conference on Modelling, Identification and Control (ICMIC), Cairo University, Egypt, pp. 328-332, Aug. 31, 2013.
El-Abbasy, et al., "Artificial neural network models for predicting condition of offshore oil and gas pipelines", Automation in Construction, May 2014, 16 pages.
Francis, et al., "Bayesian Belief Networks for Predicting Drinking Water Distribution System Pipe Breaks", Reliability Engineering and System Safety, vol. 130, pp. 1-10, May 2014.
PCT/US2018/025661 received an International Search Report and Written Opinion dated Jun. 20, 2018, 15 pages.
European Application No. EP18720076.1 received an Office Action dated Sep. 23, 2020, 10 pages.
Bian et al., Aging-Aware Timing Analysis Based on Machine Learning, Information Processing Society of Japan, Design Automation Symposium 2016, Sep. 7, 2016, pp. 44-49, English abstract attached.
Kanoga et al., A Model for Predicting Child's Emotions in Playing Card Game Using Single-Channel Electroencephalographic Signals, the papers of TechnicalMeeting on "Perception Information", IEE Japan, Sep. 1, 2014, pp. 117-120, English abstract attached.
Lantz; Brett, Machine Learning with R, Second Edition, Shoeisha, Mar. 2, 2017, pp. 18-21, 284-304, 311-313, 326-334. (Original text and English Version from2013).
Santos et al., Real-Time Monitoring of Gas Pipeline through Artificial Neural Networks, 2013 BRICS Congress on Computational Intelligence and 11th Brazilian Congress on Computational Intelligence, 2013, pp. 329-334.
Shimoda; Norihiro, Detailed explanation, Apache Spark, First Edition, Gijutsu-Hyoron Co., Ltd., Jun. 1, 2016, pp. 206-211, 223, No English Translation Available.
European Application No. 18720076.1, Summons to Attend Oral Proceedings mailed on Nov. 5, 2021, 12 pages.
Japanese Application No. JP2019-554997, received a First Office Action dated Dec. 7, 2021, 7 pages (Original Office Action and English references cited).

* cited by examiner

| | 302 | 304 | 306 | 308 | 310 | 312 | 314 | 316 | 318 | 320 | 322 | 324 |
|---|---|---|---|---|---|---|---|---|---|---|---|---|
| | fid | wsm_nbr | use_type | pipe_diam | len_ft | thickness | material | relined | plr_num | plr_year | soil_res | leak_freq |
| | 9277583 | 172-147 | DIST | 12 | 329.7600 | 0.71 | CI | #NULL# | 38754 | 1934 | 1138.839 | 0 |
| | 4215359 | 206-150 | DIST | 6 | 664.0825 | 0.43 | CI | CL | 71118 | 1954 | 3601.720 | 0 |
| | 6253942 | 124-129 | DIST | 4 | 10.8400 | 0.00 | CI | #NULL# | 70842 | 1954 | 1556.318 | 0 |
| | 9510661 | 226-144 | DIST | 20 | 129.0000 | 0.31 | STL | CL | 86973 | 1968 | 4668.634 | 0 |
| | 3206401 | 204-132 | DIST | 4 | 440.9578 | 0.38 | CI | CL | 76489 | 1957 | 1015.702 | 0 |
| | 9148005 | 170-135 | DIST | 6 | 7.4076 | 0.40 | CI | CL | 80968 | 1962 | 1931.740 | 0 |

| | 326 | 328 | 330 | 332 | 334 | 336 | 338 | 340 |
|---|---|---|---|---|---|---|---|---|
| | leak_yn | district | pipe_age | material_life | pct_life | thickness | pipe_elevation | within_hill |
| 1 | N | East Valley | 82 | 100 | 82 | 333.638 | 666.362 | N |
| 2 | N | East Valley | 62 | 100 | 62 | 211.726 | 922.274 | N |
| 3 | N | Western | 62 | 100 | 62 | 275.792 | 253.208 | Y |
| 4 | N | East Valley | 48 | 120 | 40 | 155.763 | 1293.24 | Y |
| 5 | N | West Valley | 59 | 100 | 59 | 179.307 | 954.693 | N |
| 6 | N | West Valley | 54 | 100 | 54 | 317.877 | 757.123 | N |

| Prediction | Reference | |
|---|---|---|
| | N | Y |
| N | 256803 | 107 |
| Y | 0 | 8383 |

$overall

| Accuracy | Kappa | AccuracyLower | AccuracyUpper | AccuracyNull | AccuracyPValue | McnemarPValue |
|---|---|---|---|---|---|---|
| 9.995967E-01 | 9.934502E-01 | 9.995126E-01 | 9.996695E-01 | 9.679976E-01 | 0.000000E+00 | 1.215611E-24 |

504

$byClass 508

| | Sensitivity | Specificity | Pos Pred Value | Neg Pred Value | Precision |
|---|---|---|---|---|---|
| | 0.98739694 | 1.00000000 | 1.00000000 | 0.99958351 | 1.00000000 |
| | Recall | F1 | Prevalence | Detection Rate | Detection Prevalence |
| | 0.98739694 | 0.99365851 | 0.03200235 | 0.03159902 | 0.03159902 |
| Balanced Accuracy | | | | | |
| 0.99369847 | | | | | |

|  | Reference | |
|---|---|---|
| Prediction | N | Y |
| N | 196583 | 2123 |
| Y | 60220 | 6367 |

$overall

| Accuracy | Kappa | AccuracyLower | AccuracyUpper | AccuracyNull |
|---|---|---|---|---|
| 0.7650032 | 0.1196371 | 0.7633850 | 0.7666156 | 0.9679976 |
| AccuracyPValue | McnemarPValue | | | |
| 1.0000000 | 0.0000000 | | | |

804

$byClass

| Sensitivity | Specificity | Pos Pred Value | Neg Pred Value |
|---|---|---|---|
| 0.74994111 | 0.76550118 | 0.09561927 | 0.98931587 |
| Precision | Recall | F1 | Prevalence |
| 0.09561927 | 0.74994111 | 0.16961253 | 0.03200235 |
| Detection Rate | Detection Prevalence | Balanced Accuracy | |
| 0.02399988 | 0.25099418 | 0.75772114 | |

| Coefficients: | | | | | |
|---|---|---|---|---|---|
| | Estimate | Std. Error | z value | Pr(>\|z\|) | |
| (intercept) | -1.635E+01 | 1.582E+02 | -0.103 | 0.917689 | |
| use_type#NULL# | 1.387E+00 | 4.620E+02 | 0.003 | 0.997604 | |
| use_typeAMMONIA | -3.316E+00 | 6.670E+02 | -0.005 | 0.996033 | |
| use_typeCHLOR | -9.752E-01 | 2.185E+02 | -0.004 | 0.996440 | |
| use_typeDECOM | 9.977E+00 | 1.582E+02 | 0.063 | 0.949720 | |
| use_typeDIST | 1.128E+01 | 1.582E+02 | 0.071 | 0.943158 | |
| use_typeDRAIN | 1.042E+01 | 1.582E+02 | 0.066 | 0.947469 | |
| use_typeIRRIG | -1.170E+01 | 3.346E+02 | -0.035 | 0.972114 | |
| use_typeLSLATERAL | 1.943E+00 | 4.382E+02 | 0.004 | 0.996463 | |
| use_typeMANIFOLD | 4.858E-01 | 1.997E+02 | 0.002 | 0.998059 | |
| use_typeRECL | 1.009E+01 | 1.582E+02 | 0.064 | 0.949156 | |
| use_typeTRUNK | 1.130E+01 | 1.582E+02 | 0.071 | 0.943064 | |
| use_typeWELL | 1.244E+01 | 1.582E+02 | 0.079 | 0.937341 | |
| pipe_diam | -1.799E-01 | 5.232E-03 | -34.388 | < 2e-16 *** | |
| len_ft | 3.235E-03 | 3.684E-05 | 87.817 | < 2e-16 *** | |
| thickness | -7.845E-02 | 2.140E-02 | -3.666 | 0.000247 *** | |
| materialAC | 2.379E-01 | 1.015E+00 | 0.234 | 0.814728 | |
| materialBRS | -1.192E+01 | 5.918E+02 | -0.020 | 0.983933 | |
| materialCI | 1.248E+00 | 1.014E+00 | 1.231 | 0.218454 | |
| materialCM | 1.438E+00 | 1.475E+00 | 0.975 | 0.329427 | |
| materialCONC | 5.840E-01 | 1.418E+00 | 0.412 | 0.680490 | |
| materialCOP | 2.146E-01 | 1.021E+00 | 0.210 | 0.833561 | |
| materialDI | -4.200E-01 | 1.016E+00 | -0.413 | 0.679330 | |
| materialHDPE | 3.297E+00 | 1.331E+00 | 2.478 | 0.013229 * | |
| materialPP | 4.033E+00 | 1.061E+03 | 0.004 | 0.996967 | |
| materialPVC | 3.140E+00 | 1.541E+00 | 2.038 | 0.041589 * | |
| materialSTL | 5.906E-01 | 1.015E+00 | 0.582 | 0.560635 | |
| soil_res | -3.360E-04 | 1.225E-05 | -27.437 | < 2e-16 *** | |
| districtCentral | 1.339E+00 | 3.553E-01 | 3.767 | 0.000165 *** | |
| districtEast Valley | 9.090E-01 | 3.586E-01 | 2.535 | 0.011254 * | |
| districtHarbor | 1.166E+00 | 3.566E-01 | 3.270 | 0.001077 ** | |
| districtWest Valley | 3.182E-01 | 3.580E-01 | 0.889 | 0.374179 | |
| districtWestern | 1.150E+00 | 3.556E-01 | 4.223 | 2.41e-05 *** | |
| pct_life | 1.106E-03 | 1.470E-04 | 7.519 | 5.50e-14 *** | |
| max_pressure | 2.442E-03 | 1.432E-04 | 17.053 | < 2e-16 *** | |
| pipe_elevation | -2.224E-04 | 6.287E-05 | -3.537 | 0.000405 *** | |
| within_hillY | 1.702E-01 | 2.917E-02 | 5.836 | 5.36e-09 *** | |
| | | | | | |
| Signif. Codes: | 0 *** | 0.001 ** | 0.01 * | | |

|  | Reference | |
|---|---|---|
| Prediction | N | Y |
| N | 244995 | 5731 |
| Y | 11808 | 2759 |

$overall

| Accuracy | Kappa | AccuracyLower | AccuracyUpper | AccuracyNull |
|---|---|---|---|---|
| 0.9338882 | 0.2072641 | 0.9329360 | 0.9348309 | 0.9679976 |
| AccuracyPValue | McnemarPValue | | | |
| 1.0000000 | 0.0000000 | | | |

1004

$byClass

| Sensitivity | Specificity | Pos Pred Value | Neg Pred Value | |
|---|---|---|---|---|
| 0.32497055 | 0.95401923 | 0.18940070 | 0.97714238 | |
| Precision | Recall | F1 | Prevalence | |
| 0.18940070 | 0.32496055 | 0.23931995 | 0.03200235 | |
| Detection Rate | Detection Prevalence | Balanced Accuracy | | |
| 0.01039982 | 0.05490910 | 0.63949489 | | |

AUTONOMOUS ARTIFICIALLY INTELLIGENT SYSTEM TO PREDICT PIPE LEAKS

CROSS-REFERENCES TO RELATED APPLICATIONS

This application claims the benefit of and the priority to U.S. Provisional Application No. 62/485,314, filed on Apr. 13, 2017, titled "A NOVEL AUTONOMOUS ARTIFICIALLY INTELLIGENT SYSTEM TO PREDICT PIPE LEAKS", and hereby incorporated by reference in its entirety for all purposes.

BACKGROUND

Utility companies often use pipes to convey and deliver a utility (e.g., pipes to deliver water). However, over time these pipes may fail for a variety of reasons and begin to develop leaks. These leaks are very costly for the utility companies for numerous reasons. The utility companies may have to bear the loss of the leak (e.g., the cost of the water leaking out of a pipe) or any damages associated with the leak (e.g., flooding resulting from the water). There are also costs associated with identifying and fixing the leak since some pipes are not easily accessible (e.g., buried underground), and in some cases the leak may not be immediately apparent. Pipe leaks cause water main breaks and sinkholes which, in addition to being hazards to the environment and public health, cause economic damage to surrounding businesses, waste of taxpayer dollars, traffic delays, and opportunity costs. To fix pipes that are leaking, utilities must reroute water to other pipes. This puts large amounts of additional stress on those pipes, which may lead to a chain reaction of pipe leaks over a very large geographic area and in places far away from the original pipe leak. Furthermore, with the ability to predict whether a certain pipe will leak, the Utility can design and enforce new manufacturer purchasing standards for construction bid contracts for future pipes that decrease the likelihood of a leak.

These utility companies would benefit tremendously from being able to predict in advance which pipes will leak, as that would allow the companies to devote their resources to stopping these leaks before they happen. However, in practice, this can be quite difficult to do. In different instances, the pipes are of varying dimensions and materials and they are also installed in various locations and manners. In other words, there may be many factors that dictate whether a specific pipe will leak.

Thus, there exists a need for a reliable, accurate pipe leak prediction system that can take into account the numerous factors that influence pipe leaks. Embodiments of the present disclosure are directed to addressing at least these needs.

BRIEF SUMMARY

Embodiments described in the present disclosure are directed towards pipe leak prediction systems configured to predict whether a pipe (e.g., a utility pipe carrying some substance such as water) is likely to leak. The pipe leak prediction system may include a predictive model based on one or more machine learning techniques. For example, a predictive model can be generated using a supervised machine learning method for classifying outputs into a category (e.g., leak or no leak), such as a random forest model. The predictive model may be trained using data for pipes contained in a training dataset, which may contain information regarding the characteristics of various pipes (e.g., the dimensions of those pipes, the materials of those pipes, the age of those pipes, the locations of those pipes, and so forth) and knowledge on whether those pipes leaked. The predictive model can use the data in the training dataset in order to determine the patterns associated with pipes without leaks and the patterns associated with pipes with leaks. These patterns can be applied to the characteristics of any pipe in order to predict whether that pipe will leak.

In some embodiments, once the predictive model has been generated it can be validated against a validation dataset by comparing pipe leak predictions against the knowledge of which of those pipes actually leaked. Afterwards, a confusion matrix can be generated based on these results and can be interpreted in order to obtain valuable insights about the predictive model. Once the predictive model has been validated, the predictive model may then be applied to any pipe in order to predict whether that pipe will leak. Any pipes that are identified as likely to leak can be assigned for further investigation for potential repair or preventative maintenance.

In some embodiments, a computing system and/or computer-implemented method is disclosed for predicting pipe leaks. For example, the method may include accessing a training dataset including first data items and known leaks associated with respective pipes of a first plurality of pipes, wherein the first data items include characteristics of the respective pipes. A supervised machine learning technique may be applied to this training dataset to generate a predictive model configured to determine a leak prediction of a pipe by training the predictive model based on the first data items associated with respective pipes of the first plurality of pipes. Once the predictive model has been generated, the method may further include accessing a validation dataset including second data items and known leaks associated with respective pipes of a second plurality of pipes, wherein the second data items include characteristics of the respective pipes. Using the validation dataset, the predictive model can be validated by determining a set of leak predictions of the pipes of the second plurality of pipes by applying the predictive model to the second data items. The leak predictions of the pipes of the second plurality of pipes can be compared with known leaks of the pipes of the second plurality of pipes to determine an accuracy of the leak predictions of the pipes of the second plurality of pipes. Afterwards, a confusion matrix can be generated based on the accuracy of the leak predictions of the pipes of the second plurality of pipes. From the confusion matrix, a true positive rate and a true negative rate can be determined which are associated with the accuracy of the leak predictions of the pipes of the second plurality of pipes. Once it is determined that the predictive model is valid (e.g., the true positive rate is determined to be above a first threshold value and the true negative rate is determined to be above a second threshold value), the method may further include accessing a pipeline dataset including third data items associated with a third plurality of pipes. The validated predictive model can be applied to this pipeline dataset to determine leak predictions of respective pipes of the third plurality of pipes.

BRIEF DESCRIPTION OF THE DRAWINGS

FIG. 3 illustrates example data associated with various pipes in accordance with embodiments of the present disclosure.

FIG. 5 illustrates a confusion matrix for a random forest model in accordance with embodiments of the present disclosure.

FIG. 8 illustrates a confusion matrix for a logistic regression in accordance with embodiments of the present disclosure.

FIG. 9 illustrates a list of coefficients for a logistic regression in accordance with embodiments of the present disclosure.

FIG. 10 illustrates a confusion matrix for a naïve Bayes model in accordance with embodiments of the present disclosure.

DETAILED DESCRIPTION

Figure 1:
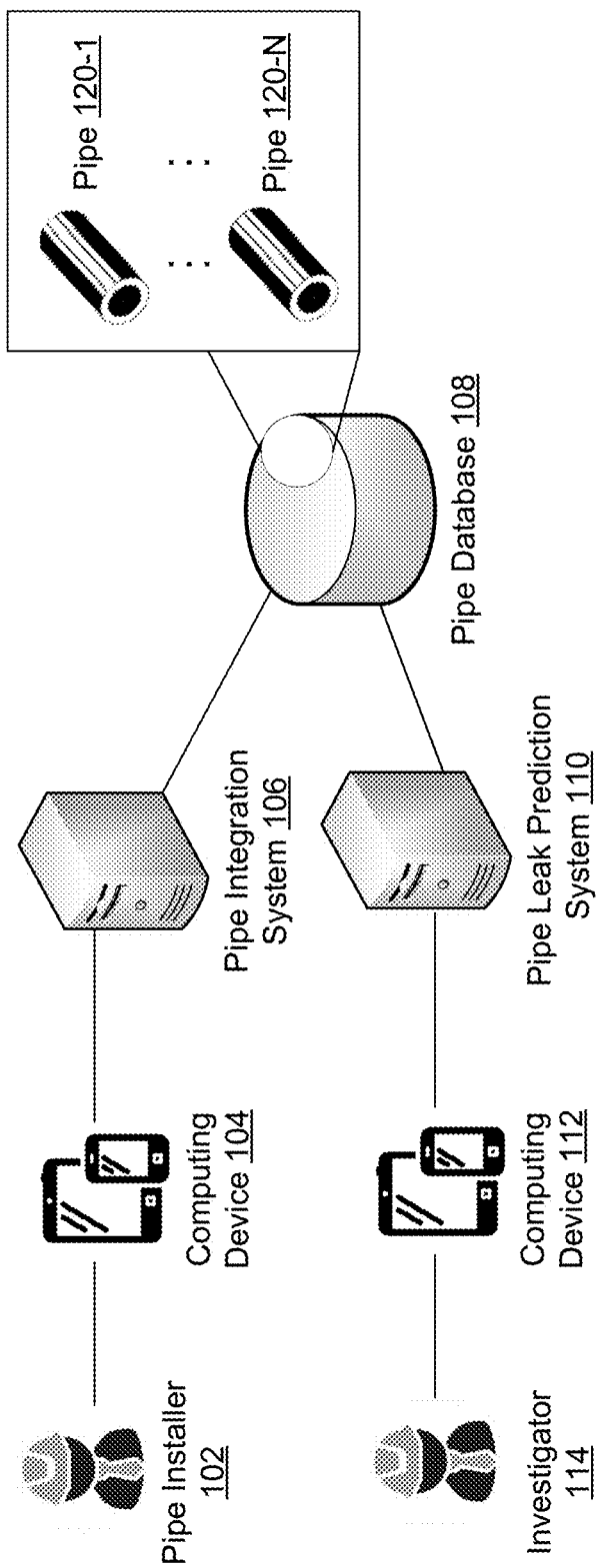
FIG. 1 illustrates a system diagram for pipe leak prediction in accordance with embodiments of the present disclosure.

In the following description, for the purposes of explanation, specific details are set forth in order to provide a thorough understanding of embodiments of the invention. However, it will be apparent that various embodiments may be practiced without these specific details. The figures and description are not intended to be restrictive.

Systems depicted in some of the figures may be provided in various configurations. In certain embodiments, the systems may be configured as a distributed system where one or more components of the system are distributed across one or more networks in a cloud computing system. In certain embodiments, the systems may be configured to operate in virtual or non-virtual environments.

Introduction

A pipe leak prediction system can be used by any entity employing pipes, such as utility companies (e.g., companies that transport water, gas, sewage, etc.) or energy exploration/production companies (e.g., companies that transport oil, gas, and fuels via pipes), in order to predict in advance whether a pipe is likely to fail. This prediction can be used in order to take preventative measures, such as performing maintenance on the pipe.

Some traditional methods of predicting pipe leaks are theoretical based and may rely on assumptions rather than empirical data. For example, one embodiment of a pipe leak prediction system assumes that factors such as the past history of pipe leaks is the most important factor. In other words, whether a pipe has already leaked in the past is the most important determinant of whether the pipe will leak again in the future. However, such a system may overlook other important factors and may also rely on assumptions that are not empirically validated or fully understood. For example, a system may correctly assume that a pipe that has previously leaked may be highly likely to leak again, but such a system does not provide any explanation on why exactly that pipe leaked in the first place. Accordingly, such a system is not very useful for predicting the first occurrence of a leak in a pipe because its predictions are so reliant on the pipe previously leaking.

Instead, various embodiments in the present disclosure are directed towards a data-based pipe leak prediction system designed to predict pipe leaks. Such a system would allow any available data on pipe leaks to speak for itself, and this system would be able to determine on its own what factors are important or not important. In some embodiments, this pipe leak prediction system may also be able to determine the relative importance of the different factors and any relationships between those factors (e.g., correlation/causation). This determination can be used to accurately predict first time leaks in pipes and gain a better understanding of the underlying cause of pipe leaks.

In some embodiments, the pipe leak prediction system may be designed to utilize a large amount of data. In some embodiments, the pipe leak prediction system may consider as much data as possible—in terms of pipes (e.g., consider data for a large number of pipes) and factors (e.g., consider data for a large variety of different factors that may affect the pipes leaking). Accordingly, the system may consider data for thousands, or millions, of pipes and there may be data on numerous attributes or factors for each pipe. The size of the data considered by the system increases greatly as more and more pipes and factors are tracked. In some cases, the total size of the data may exceed gigabytes or terabytes of data, and it would be impossible for a human being to utilize all of the data to make mental calculations or pen-and-paper computations. Thus, embodiments in the present disclosure enable data-driven analysis of a tremendous amount of data in order to accurately predict numerous cases of pipe leaks that would escape other methods.

In some embodiments, the pipe leak prediction system may utilize various machine learning algorithms. In particular, the pipe leak prediction system may use supervised machine learning techniques, such that existing data on known pipe leaks is used to train a predictive model. Examples of such supervised machine learning techniques include—but are not limited to—analytical learning, artificial neural network, backpropagation, boosting (meta-algorithm), bayesian statistics, case-based reasoning, decision tree learning, inductive logic programming, gaussian process regression, group method of data handling, kernel estimators, learning automata, learning classifier systems, minimum message length (decision trees, decision graphs, etc.), multilinear subspace learning, naive bayes classifiers, maximum entropy classifiers, conditional random fields, nearest neighbor algorithms, probably approximately correct learning (PAC) learning, ripple down rules, support vector machines, minimum complexity machines (MCM), random forests, ensembles of classifiers, ordinal classification, data pre-processing, and statistical relational learning.

In some embodiments, the pipe leak prediction system may utilize supervised machine learning techniques that are classification-based, such that input data for pipes are used to classify each pipe into one or more categories (e.g., likely to leak or not likely to leak). Examples of classification-type supervised machine learning techniques include support vector machines (SVM), neural networks, naïve bayes classifiers, decision trees, Adaptive Boosting (AdaBoost), Extreme Gradient Boosting (XGBoost), discriminant analysis, and nearest neighbors (kNN).

In some embodiments, the pipe leak prediction system may utilize supervised machine learning techniques that are regression based, such that input data for pipes are used to calculate continuous-response values for various pipes (e.g., a probability of leaking or an amount of time before the pipe is likely to leak). Examples of regression-type supervised machine learning techniques include linear regression, lasso regression, ridge regression, elasticnet regression, partial least squares regression, polynomial regression, random forests, SVM, XGBoost, Adaboost, nonlinear regression, generalized linear models, decision trees, and neural networks. In some embodiments, the pipe leak prediction system may be configured to make predictions that factor in time. In other words, the system may be able to predict not only when a pipe will fail, but also at what time it will fail. For example, the system may predict a pipe will fail within 100 days.

In some embodiments, the pipe leak prediction system may utilize a combination of different predictive models or machine learning techniques. Different machine learning techniques may have different advantages and disadvantages, and thus, may be utilized for different purposes. For example, one machine learning technique can be used to obtain a set of results or information, while another machine learning technique can be used to obtain a different set of results or information unobtainable by the other technique. In some cases, a machine learning technique can be used to validate the results of another machine learning technique. In some cases, multiple machine learning techniques can be combined in an ensemble which boosts the predictive accuracy over and above the component techniques.

In the present disclosure, embodiments of a pipe leak prediction system are disclosed that use random forest, a generalized linear model (e.g., logistic regression model), and naïve bayes as a combination of machine learning techniques. However, this combination is for exemplary purposes only and is continually referenced in this application for the purposes of facilitating understanding. Other suitable combinations of machine learning algorithms may be used.

EXAMPLE EMBODIMENTS

FIG. 1 illustrates a system diagram for pipe leak prediction in accordance with embodiments of the present disclosure.

In some embodiments, a pipe installer 102 may be tasked with installing a pipe (not shown) on behalf of an entity, such as a utility company. The pipe installer 102 may install the pipe and then provide details regarding the installed pipe to the pipe integration system 106 via the computing device 104. For example, the pipe installer 102 may install a pipe in a hillside and then use computing device 104 to provide the pipe integration system 106 with details or attributes associated with the pipe, such as information about the location of the pipe, the dimensions and material of the pipe, the purpose and contents carried by the pipe, and so forth.

This information may include data for numerous factors that may be considered by the pipe leak prediction system in determining whether a specific pipe will leak, and other examples of details/attributes of the pipe are shown in FIG. 3. The pipe integration system 106 may store this data for the pipe in a pipe database 108, which may contain data for various pipes installed by the utility company (e.g., pipes 120-1 through 120-N).

In some embodiments, the pipe installer 102 may not have to supply this information to the pipe integration system 106 because certain details for the pipe may already be known. For example, the pipe installer 102 could also be tasked with ordering the pipe to be installed from a pipe manufacturer. Accordingly, specific details about the pipe can be taken from the order and provided to the pipe integration system 106, such that information regarding the pipe is already available in the pipe database 108. However, the pipe installer 102 may have to update some of the information associated with the pipe using the computing device 104 (e.g., during installation of the pipe, the conditions at the installation site ended up being different from expected). The information associated with each pipe may also have to be updated over time as things change. For example, the pipe database 108 may include information on whether each pipe has leaked. If a pipe with no leaks develops a leak, then that information would have to be updated within the pipe database 108. This updating can be done through the pipe integration system 106 or in the field, such as by the pipe installer 102 using the computing device 104.

Accordingly, the pipe database 108 may contain a vast amount of data for various pipes installed by the utility company, including the pipe installed by the pipe installer 102, which will change and be updated over time. This is represented in the figure by the contents of the pipe database 108, shown to include information on pipes 120-1 through 120-N. This information may include specifications for each pipe, the purpose and contents carried by each pipe, and so forth. The data in pipe database 108 may be used as a training set for the pipe leak prediction system 110, which may be able to use all the information associated with the various pipes in order to determine patterns among all the pipes that have developed leaks. In addition to these patterns, the pipe leak prediction system 110 may also be able to discern any relationships between the various factors that determine whether a pipe will develop a leak and use that information to develop a predictive model.

In some embodiments, the pipe leak prediction system 110 can be used in order to predict the failure or the development of leaks in pipes. This may include making predictions regarding pipes 120-1 to 120-N in the pipe database 108 (e.g., as their associated information is updated over time). The pipe leak prediction system 110 may also be able to make predictions on pipes outside of pipe database 108, such as for newly installed pipes that have not yet been introduced to the pipe database 108. For example, after the pipe installer 102 installs a pipe (or even immediately prior to installation) and provides the input information associated with that pipe to the pipe leak prediction system 110, the system may be able to predict or estimate whether that pipe is likely to fail, when the pipe is likely to fail, the probability that the pipe will likely fail, and so forth. In some embodiments, the pipe leak prediction system 110 may be able to provide a list of pipes identified as likely to leak to an investigator 114 through the computing device 112. The investigator 114 may be able to use that information to go investigate the pipes determined as likely to leak to see if preventative maintenance needs to be performed, or in some cases, replacing any pipes that have already started to leak.

Figure 2:
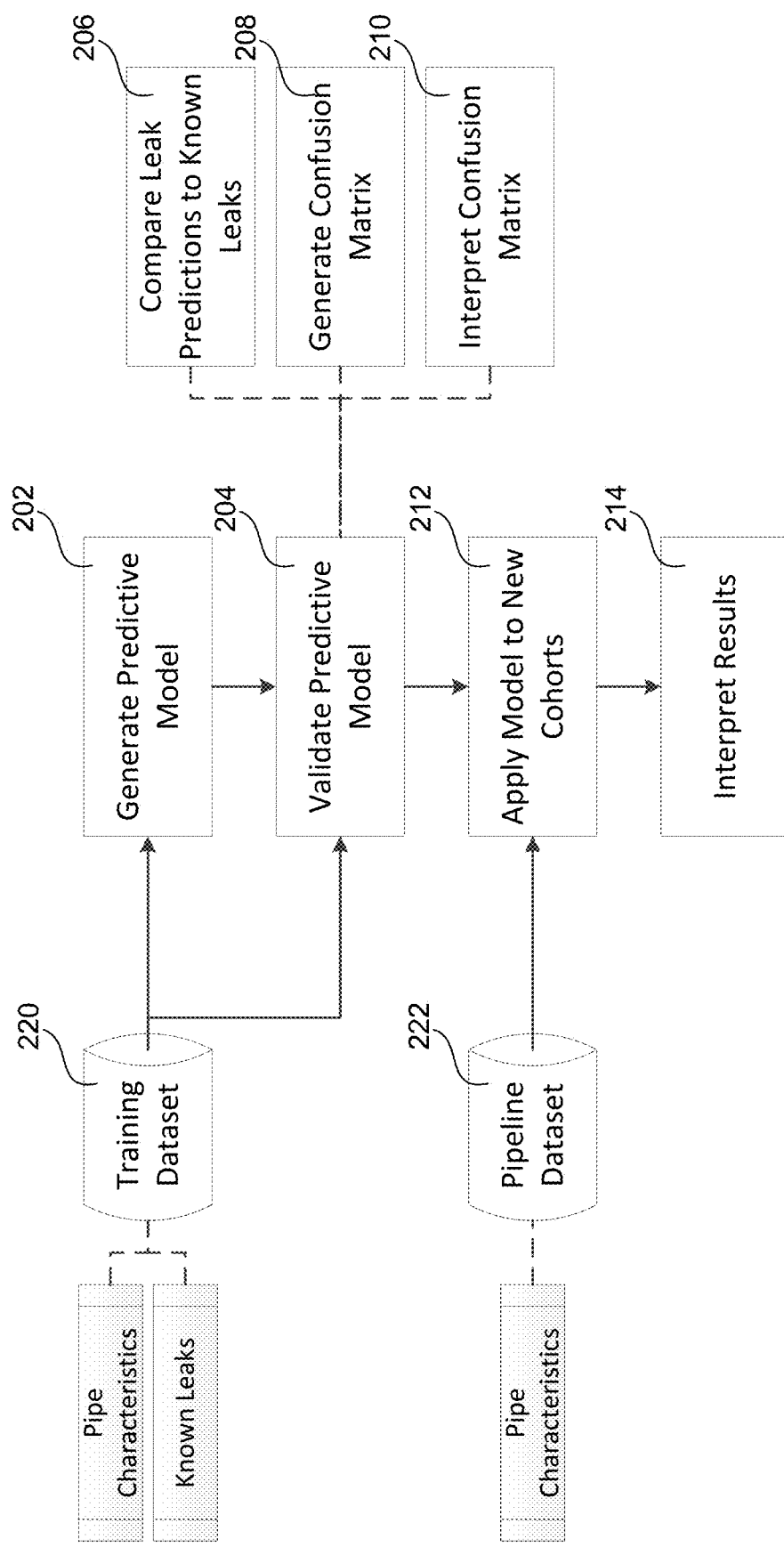
FIG. 2 illustrates a flow chart for pipe leak prediction in accordance with embodiments of the present disclosure.

FIG. 2 illustrates a flow chart for pipe leak prediction in accordance with embodiments of the present disclosure.

At block 202, a predictive model may be generated using data for pipes contained within a training dataset 220. The training dataset 220 may be a subset of a larger dataset, such as pipe database 108, containing data for a variety of pipes. The larger dataset may be randomly split into the training dataset 220 used to train the predictive model, as well as a validation dataset used to validate the results of the trained predictive model. The training dataset 220 may contain information regarding the characteristics of various pipes (e.g., the dimensions of those pipes, the materials of those pipes, the age of those pipes, the locations of those pipes, and so forth). Furthermore, the training dataset 220 may also contain information regarding which of those pipes are known to have leaks. Thus, the predictive model can use the data in the training dataset 220 in order to determine the patterns associated with pipes without leaks and the patterns associated with pipes with leaks. The model may be able to learn and use those patterns to predict leaks in pipes when provided with the characteristics of those pipes. The predictive model may be generated using various machine learning algorithms such as the ones previously described; for example, the predictive model may be a random forest model, a logistic regression model, a naïve bayes model, and so forth.

At block 204, once the predictive model has been generated the model can be validated. The validation of the predictive model may involve one or more sub-blocks, such as sub-blocks 206, 208, and 210. At block 206, the predictive model can be used to predict pipe leaks using pipe data from the validation dataset. For example, the predictive model will take the characteristics of the various pipes in the validation dataset as inputs and use them to identify which of those pipes are likely to leak. At the same time, the validation dataset will contain data regarding which of those pipes did in fact leak. Thus, the set of predicted pipes with leaks can be compared against the set of pipes that actually have leaks in order to determine the accuracy of the model. At block 208, a confusion matrix can be generated based on the comparison of the results of the predictive model against the known statuses (e.g., leak or no leak) of the pipes. This confusion matrix can show the amount of true positives, true negatives, false positives, and false negatives that were identified by the predictive model, which can be further used to calculate the accuracy associated with the predictive model. At block 210, the confusion matrix can be interpreted in order to obtain valuable insights about the predictive model. For example, if the confusion matrix reveals the model having a high degree of accuracy then it could be possible that the underlying assumptions associated with the model are correct. In some embodiments, there may be an automatic translation of inferences from the machine learning model into a human readable format (e.g., a report can be generated in PDF format or a text message that can be sent to investigators in the field). This would allow humans to focus on the insights resulting from the machine learning algorithms rather than having to understand their numerical output, which may require considerable statistics/mathematical expertise. In some embodiments, a user may have the option to dive into the details of the model and draw inferences on their own or have the details/inferences from the model provided to them directly by the pipe leak prediction system.

At block 212, once the predictive model has been validated, the predictive model may then be applied to new cohorts (e.g., pipes not in the training or validation datasets). For example, the predictive model could be applied to pipe data in a pipeline dataset 222 that contains data for the characteristics of various pipes. The predictive model would be used to identify which of the pipes in the pipeline dataset 222 are likely to leak.

At block 214, the results of the predictive model applied to the pipeline dataset 222 can be interpreted. For example, the predictive model may have identified a subset of the pipes in the pipeline dataset 222 that are likely to leak. These pipes may be further investigated for potential repair or preventative maintenance. In some embodiments, the identification of these pipes likely to leak may be provided to an investigator tasked with investigating the pipe and validating the prediction results, such as the investigator 114. The pipe leak prediction system may inform the investigator 114 of the pipes in the pipeline dataset 222 likely to leak through a computing device 112, and the investigator 114 may use his/her resources to investigate those identified pipes.

FIG. 3 illustrates example data associated with various pipes in accordance with embodiments of the present disclosure.

More specifically, FIG. 3 shows raw data associated with six pipes which are identified based on their "fid" (e.g., pipe id) shown in column 302 and "wsm_nbr" (e.g., tracking number) shown in column 304. For example, the first pipe has a fid of "9277583" and a wsm_nbr of "172-147". Various kinds of information are available for each of the pipes. However, this list is not meant to be exhaustive and is for exemplary purposes, such as to show how data could be stored in the pipe database 108 of FIG. 1; other data associated with the pipes can be included and considered by the pipe leak prediction system in generating a predictive model.

In some embodiments, the data may include column 306 (shown with the header "use_type") which signifies a categorical variable indicating how a pipe may be used. Examples of variables for the various use types for the pipes include: DIST (e.g., distribution), TRUNK (e.g., trunkline), IRRIG (e.g., irrigation), DECOM (e.g., decomposition pipe), WELL (e.g., well), CHLOR (e.g., chlorine), DRAIN (e.g., drainage pipe), AMMONIA (e.g., ammonia), RECL (e.g., reclaimed water pipe), MANIFOLD (e.g., manifold pipe), LSLATERAL (e.g., lateral sewer line), and #NULL# (which may signify the use of the pipe is not known or does not conform to one of the other categories for use types). For instance, column 306 shows DIST for all six pipes which signifies that each of the six pipes is used for distribution. With the addition of use types for the various pipes, the pipe leak prediction system may be able to determine whether specific use types are more likely to cause leaks in a pipe.

In some embodiments, the data may include column 308 (shown with the header "pipe_diam") which signifies a numeric variable indicating how wide the pipe is. Any measuring unit can be specified in advance and used. In the figure, the numbers of column 308 may represent the width of each pipe in inches. For example, column 308 has a value of 12 associated with the first pipe, which may indicate that the first pipe has a 12-inch diameter. Knowing the diameter of each pipe may allow the pipe leak prediction system to determine how the diameter of a pipe may increase or decrease the likelihood of a pipe leak.

In some embodiments, the data may include column 310 (shown with the header "len_ft") which signifies a numeric variable indicating how long the pipe is. Any measuring unit can be specified in advance and used. In the figure, the numbers of column 310 may represent the length of each pipe in feet. For example, column 310 has a value of 329.76 associated with the first pipe, which may indicate that the first pipe has a length of almost 330 ft. Knowing the length of each pipe may allow the pipe leak prediction system to determine how the length of a pipe may increase or decrease the likelihood of a pipe leak.

In some embodiments, the data may include column 312 (shown with the header "thickness") which signifies a numeric variable indicating how thick the wall of the pipe is. Any measuring unit can be specified in advance and used. In the figure, the numbers of column 312 may represent the thickness of the wall of each pipe in inches. For example, column 312 has a value of 0.71 associated with the first pipe, which may indicate that the first pipe has thickness of three quarters of an inch. Knowing the thickness of the wall of each pipe may allow the pipe leak prediction system to determine how the wall thickness of a pipe may increase or decrease the likelihood of a pipe leak. Although common sense suggests that a thicker wall would decrease the likelihood of a pipe leak, common sense would not be able to identify the relative importance of wall thickness compared to other factors. For example, if the pipe diameter was halved and the wall thickness was reduced by one-third, common sense would not be helpful for informing whether the likelihood of a leak has increased or decreased.

In some embodiments, the data may include column 314 (shown with the header "material") which signifies a categorical variable indicating the material that a pipe is made of. Examples of variables for the various materials for the pipes include: CI (e.g., cast iron), STL (e.g., steel), AC (e.g., asbestos-cement), DI (e.g., ductile iron), COP (e.g., copper), HDPE (e.g., high-density polyethylene), CONC (e.g., concrete), PVC (e.g., polyvinyl chloride), CM (e.g., corrugated metal), BRS (e.g., brass), and PP (e.g., polypropylene). For instance, column 314 shows CI for the first pipe which may indicate the first pipe is made of cast iron. With the addition of various materials for the various pipes, the pipe leak prediction system may be able to determine whether the use of specific materials is more likely to cause leaks in a pipe.

In some embodiments, the data may include column 316 (shown with the header "relined") which signifies a categorical variable indicating whether the pipe is relined or not. Examples of variables include: CL and #NULL# (which may signify the pipe is not relined). For instance, column 316 shows #NULL# for the first pipe which may indicate the first pipe is not relined. Knowing whether each pipe is relined may allow the pipe leak prediction system to determine the impact of relining a pipe on the likelihood of a pipe leak.

In some embodiments, the data may include column 318 (shown with the header "plr_num") and column 320 (shown with the header "plr_year"), the latter of which may signify a numeric variable for the year that a pipe is installed. For instance, column 320 shows 1934 for the first pipe which may indicate the first pipe was installed in the year 1934. Knowing the year each pipe was installed may allow the pipe leak prediction system to determine the effect of installation year on the likelihood of a pipe leak (e.g., perhaps for some years the pipes were improperly installed and are more likely to leak).

In some embodiments, the data may include column 322 (shown with the header "soil_res") which signifies a numeric variable for the resistivity of the soil in which a pipe is installed. In other words, this column indicates how corrosive the soil is in which the pipe is installed. Since corrosion causes pipes to erode, a pipe that is brand new and located in corrosive soil may be expected to leak earlier than an older pipe located in non-corrosive soil. Higher values of soil resistivity may be associated with less corrosiveness. For example, column 322 shows 1138 for the soil resistivity of the first pipe and 3601 for the soil resistivity of the second pipe which may indicate that the second pipe is located in less-corrosive soil. Knowing the relative corrosiveness of the soil that each pipe is located in may allow the pipe leak prediction system to determine the impact of soil corrosiveness on the likelihood of a pipe leaking.

In some embodiments, the data may include column 324 (shown with the header "leak_freq") which signifies a numeric variable for how many times that pipe has leaked. In other words, a value of zero indicates that the pipe has not yet leaked. As shown in the figure, column 324 shows zero for the leak frequency of the first pipe which may indicate that the first pipe has not yet leaked. This properly corresponds to column 326 (shown with the header "leak_yn") which signifies a categorical variable for whether the pipe has leaked (e.g., a value of "N" or "Y"). Column 326 has a value of N for the first pipe which properly corresponds to the value of zero in column 324, indicating that the first pipe has not leaked yet. In some cases, a pipe that has previously leaked may have increased likelihood of leaking again. Knowing whether a pipe has previously leaked or not may allow the pipe leak prediction system to determine the impact of a previous leak on the likelihood of a pipe leaking.

In some embodiments, the data may include column 328 (shown with the header "district") which signifies a categorical variable indicating where the pipe is located geographically. Examples of variables include: East Valley, Western, West Valley, Harbor, and Central. Other variables or concepts of geographical location may be used. In the figure, column 328 has a value of East Valley for the first pipe to signify where the first pipe is located. The location of a pipe may have some impact on its likelihood to leak (e.g., due to the makeup of the soil in that geographical location), so this information allows the pipe leak prediction system to determine that impact.

In some embodiments, the data may include column 330 (shown with the header "pipe_age") which signifies a numeric variable for the age of a pipe in years. For instance, the column 330 has a value of 82 for the first pipe which may indicate the first pipe is 82 years old.

In some embodiments, the data may include column 332 (shown with the header "material_life") which signifies a numeric variable for the lifespan of the material of the pipe. For instance, the column 330 has a value of 100 for the first pipe which may indicate the iron that makes up the first pipe has a lifespan of 100 years, in comparison to the 120-year material life of the fourth pipe which is made of steel.

In some embodiments, the data may include column 334 (shown with the header "pct_life") which signifies a numeric variable indicating how old the pipe is relative to the manufacturer's specifications. In some embodiments, the percentage life of a pipe may be calculated by determining how old the pipe is (e.g., column 330) relative to the material life (e.g., column 332). For instance, the first pipe is 82 years old and has a material life of 100 years, which results in a value of 82 percent shown in column 334. This normalized metric of how old a pipe is relative to its lifespan may be used by the pipe leak prediction system to determine how the relative age of a pipe may impact the likelihood of that pipe leaking.

In some embodiments, the data may include column 336 (shown with the header "max_pressure") which signifies a numeric variable for the max pressure that the pipe can withstand. Any measuring unit can be specified in advance and used. In the figure, the numbers of column 336 may represent the pressure the pipe can withstand in pounds per square inch (psi). For instance, column 336 shows 333 for the first pipe which may indicate the first pipe is rated to a maximum pressure of 333 psi. The pipe leak prediction system may be able to use this information to determine the effect of maximum pressure rating on the likelihood of a pipe leaking.

In some embodiments, the data may include column 338 (shown with the header "pipe_elevation") which signifies a numeric variable for the elevation of the pipe. Any measuring unit can be specified in advance and used. In the figure, the numbers of column 338 may represent the pipe elevation in feet. For instance, column 338 shows 666 for the first pipe which may indicate the first pipe is located at 666 feet above sea level. The pipe leak prediction system may be able to use this information to determine the effect of a pipe's elevation on the likelihood of the pipe leaking.

In some embodiments, the data may include column 340 (shown with the header "within_hill") which signifies a categorical variable indicating whether the pipe is in a hill or not (e.g., values of "N" or "Y"). For instance, column 340 shows N for the first pipe which may indicate that the first pipe is not located in a hill. The intuition is that a pipe in a hill may be more likely to leak due to the added pressure on the pipe from the hill. The pipe leak prediction system may be able to use this confirmation to confirm that intuition and determine the impact of whether a pipe is in a hill on the likelihood of the pipe leaking.

Figure 4:
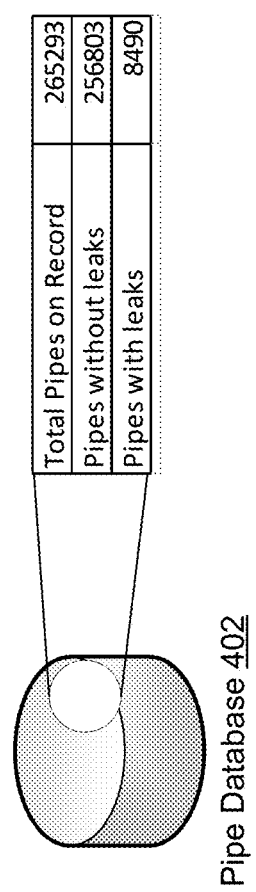
FIG. 4 illustrates an example number of pipe records in a pipe database in accordance with embodiments of the present disclosure.

FIG. 4 illustrates an example number of pipe records in a pipe database in accordance with embodiments of the present disclosure.

More specifically, FIG. 4 shows a pipe database 402 containing information associated 265,293 pipes. Of those pipes, 256,803 do not have leaks and 8,490 of those pipes have leaks. This data in pipe database 402 can be used to train the pipe leak prediction system to detect leaks, and example embodiments disclosed herein may utilize various machine learning models are explained in the context of these 265,293 pipes.

FIG. 5 illustrates a confusion matrix for a random forest model in accordance with embodiments of the present disclosure.

In some embodiments, all of the available data associated with various pipes (e.g., data similar to that shown in FIG. 3) can be used to train and construct a predictive model. In some of such embodiments, a first model that is constructed may be a random forest model, which is a non-linear model. In general, a non-linear model may take longer to train than a linear model.

In some embodiments, the random forest model may be used to predict whether a pipe will leak based on a combination of 11 factors, such as the factors or pipe attributes shown in FIG. 3. Excluded from these 11 factors may be input variables associated with leak frequency (e.g., the "leak_freq" variable of FIG. 3). This is intentional since existing expert-based models may be based on the assumption that past knowledge of whether a pipe has leaked is the most important factor in predicting whether a pipe will leak in the future. However, this assumption means that a predicted leak is heavily dependent on whether a pipe has previously leaked or not, making it difficult to predict if a pipe will leak if it has never leaked in the past (e.g., converting the problem into a pipe forecasting problem). In contrast, by excluding inputs on leak frequency the random forest model may be configured to predict whether a pipe will leak without prior knowledge that a pipe has in fact leaked.

A random forest model may be a classification-based model that results in the prediction of a binary outcome. In other words, the random forest model may be trained to generate labeled, categorical predictions (e.g., "Yes" or "No" for whether a pipe will leak). Since the output of a random forest classification is a majority vote of the individual trees in the forest, these categorical predictions will differ from the results of regression techniques (e.g., a logistic regression) in which the outputs are probabilities that further require a cutoff or threshold to be specified. The random forest model may be trained using a training set from the pipe database. For example, the pipe database containing information for the various pipes can be split at random into a training set and a test/validation set, with a 70/30 or 80/20 split being frequently used. The random forest model can be trained using the training set.

Afterwards, the random forest model may be validated and tested using the validation set from the pipe database. The random forest model can be used with the various inputs for the pipes in the validation set in order to predict whether those pipes will leak. The predictive results from the random forest model can be compared against the actual knowledge from the validation set of whether those pipes leaked. Afterwards, a confusion matrix can be constructed to evaluate the accuracy of the predictions for the pipes against the true status of those pipes.

With respect to the figure, an example confusion matrix 502 is shown in FIG. 5 for a random forest model generated based on the data illustrated in FIG. 4 (e.g., a dataset containing 265,293 pipes). The confusion matrix 502 has four quadrants for comparing the predictions against the actual reference values: the upper-left, N-N quadrant with a value of 256,803; the upper-right, N-Y quadrant with a value of 107; the lower-left, Y-N quadrant with a value of 0; and the lower-right, Y-Y quadrant with a value of 8383. These quadrants in the confusion matrix 502 reflect four outcomes: the number of true negatives, false negatives, true positives, and false positives.

The upper-left, N-N quadrant with a value of 256,803 represents the true negatives, or the number of pipes that the model predicts will not fail and the pipe did in fact not fail. The upper-right, N-Y quadrant with a value of 107 represents the false negatives, or the number of pipes that the model predicts will not fail but the pipe actually failed. The lower-left, Y-N quadrant with a value of 0 represents the false positives, or the number of pipes that the model predicted would fail but did not actually fail. The lower-right, Y-Y quadrant with a value of 8383 represents the true positives, or the number of pipes that the model predicted would fail and did in fact fail.

The model has a high overall accuracy 504 of roughly 99.6%. The model's true positive rate, also referred to as the sensitivity 506, is 98.7% which corresponds to the model detecting 8,383 (or 98.7%) of the 8,490 pipe leaks. Accordingly, when prompted with the question of "will the pipe leak", the model will return an answer that is 98.7% accurate. The model's true negative rate, also referred to as the specificity 508, is 100% which corresponds to the model correctly determining all of the 256,803 pipes that did not fail. Accordingly, when prompted with the question of "will the pipe not leak", the model will return an answer that is 100% accurate. Thus, based on these validation results shown in the confusion matrix, it can be seen that the false positive and false negative rates are quite low and the constructed random forest model is very capable of correctly identifying pipes that will leak and pipes that will not leak.

Figure 6:
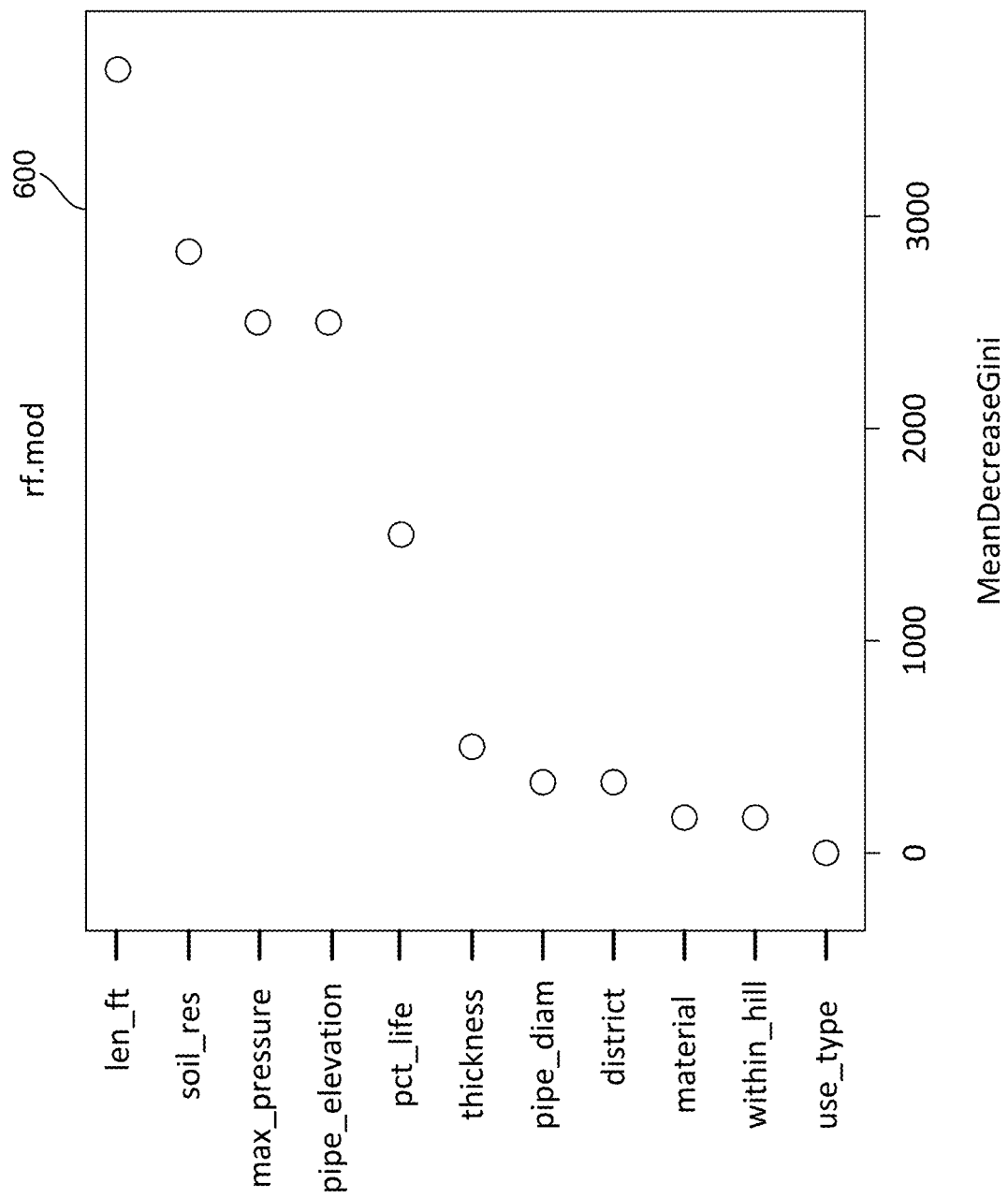
FIG. 6 illustrates a variable importance plot for a random forest model in accordance with embodiments of the present disclosure.

FIG. 6 illustrates a variable importance plot for a random forest model in accordance with embodiments of the present disclosure.

The random forest model described in FIG. 5 can also be used to determine the importance of the different variables and factors used to determine a pipe leak. The relative importance of the different variables can be plotted and visualized in a variable importance plot.

With respect to the figure, a variable importance plot 600 is shown in FIG. 6 that displays the importance of the 11 factors used in generating the random forest model. The variable importance plot 600 illustrates that the most important of those factors are the length of the pipe, the soil resistivity, the maximum pressure rating of the pipe, and the elevation of the pipe. In particular, the length of the pipe and the characteristics of the soil are significantly more important in determining a pipe leak than whether the pipe is in a hill or how the pipe is used. In fact, those four variables are so important that the random forest model could generate a very accurate prediction on whether a pipe will leak just using data for these four variables. This information is extremely useful because it signifies that a decent predictive model can be implemented cheaply if there are significant costs associated with data collection (e.g., it is difficult or costly to obtain the values for the different factors for each pipe) since only the values of those four variables can be collected. In fact, it could be the case that a relatively accurate prediction on pipe leaks can be made with just knowing the lengths of the pipes.

Furthermore, this knowledge of the most important factors behind pipe leaks can be used to govern future implementations of pipes and prevent future leaks. This knowledge can be used to obtain pipes from manufacturers or vendors that are less likely to leak. Furthermore, this information can be used to design new manufacturer requirements/standards such that a manufacturer who wants to win a construction bid must adhere to these new standards. For instance, since the length of a pipe is the most important factor in the random forest model for influencing whether a pipe will leak, future pipe installations can avoid having long pipes. Those long pipes can be replaced with a series of shorter pipes that are each less likely to develop a leak. Also, this knowledge of the importance of the factors identified by the variable importance plot 600 is rooted in the underlying data. For example, it is empirically verified that a brand new pipe in corrosive soil will have a much shorter life than an old pipe in non-corrosive soil, so any pipes being installed should be done in locations without corrosive soil if possible.

Although the variable importance plot 600 illustrates how important each factor in the random forest model is, it does not explain why each factor is specifically important. In order to obtain that understanding, a different model may be used that allows for those inferences to be made. In some cases, there may be a tradeoff between prediction and inference when it comes to machine learning techniques; the random forest model is excellent at producing accurate predictions for the pipe leaks but does not allow inferences to be made regarding the relationships of the factors used in the model. Thus, different models can be used to generate those inferences. Some examples of different models that can be used include a logistic regression model or a naïve bayes model.

Figure 7:
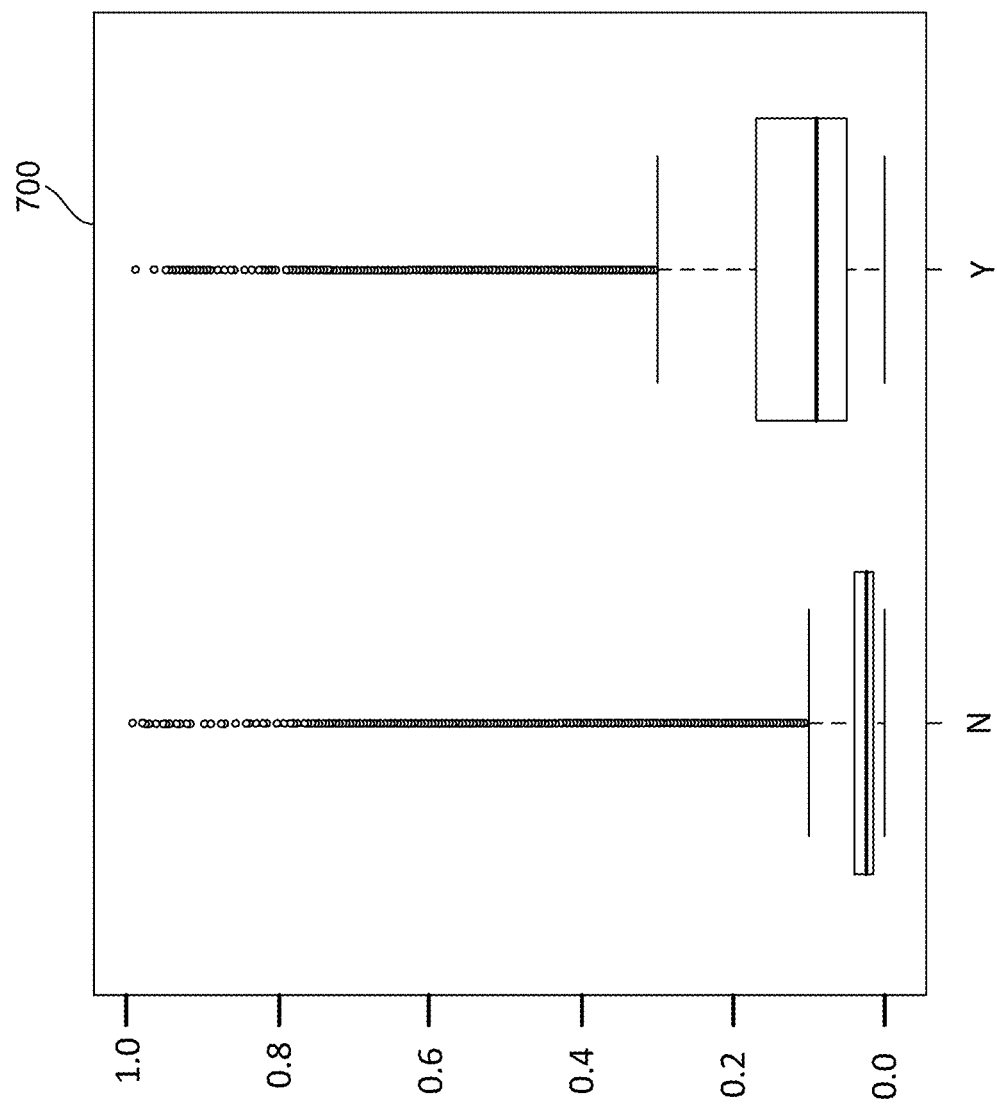
FIG. 7 illustrates a statistical distribution of probabilities for a logistic regression in accordance with embodiments of the present disclosure.

FIG. 7 illustrates a statistical distribution of probabilities for a logistic regression in accordance with embodiments of the present disclosure.

In some embodiments, a logistic regression model can be used in order to obtain a better understanding of the factors used in the random forest model. A logistic regression model may be a type of generalized linear model. Since it is a linear model, a logistic regression model may train faster than a random forest model.

However, a logistic regression model is different from a random forest model in that the logistic regression model generates continuous-response values (e.g., a probability of a pipe leaking) rather than classifying each pipe into a category (e.g., leak or no leak). Accordingly, in order to use a logistic regression model to make a similar classification for each pipe, there needs to be a cutoff or threshold specified. If the probability of a pipe leaking predicted by the logistic regression model is above that threshold, then it can be considered that the pipe is likely to leak. If the probability of a pipe leaking is predicted to be below that threshold, then it can be considered that the pipe is not likely to leak. Thus, a good threshold needs to be chosen since any probability above that threshold will be a yes, and any probability below that threshold will be a no.

In order to select an appropriate cutoff, the results from the logistic regression model can be plotted into a statistical distribution. This statistical distribution can be used in order to determine a natural cutoff for dividing the probabilities predicted by the logistic regression model into two groups.

With respect to the figure, a statistical distribution 700 of the probabilities generated from a logistic regression model is shown in FIG. 7. For instance, in the statistical distribution 700 the third quartile for the yes variable is the horizontal black bar at the 0.03 level. If this is chosen as the cutoff, that would mean that any predicted probabilities of failure at or above this 3rd quartile (0.03) would be considered a "yes"—the pipe will leak. Any predicted probabilities of failure below this cutoff would be considered a "no".

FIG. 8 illustrates a confusion matrix for a logistic regression in accordance with embodiments of the present disclosure.

Once the cutoff for the logistic regression model is calculated, the predictive results of the logistic regression model can be validated (e.g., using a validation set as before) in order to construct a confusion matrix for the logistic regression model.

With respect to the figure, an example confusion matrix 802 is shown in FIG. 8 for a logistic regression model generated based on the data illustrated in FIG. 4 (e.g., a dataset containing 265,293 pipes). The confusion matrix 802 has four quadrants for comparing the predictions against the actual reference values: the upper-left, N-N quadrant with a value of 196,583; the upper-right, N-Y quadrant with a value of 2123; the lower-left, Y-N quadrant with a value of 60220; and the lower-right, Y-Y quadrant with a value of 6367. Similar to the confusion matrix of FIG. 5, these quadrants in the confusion matrix 802 reflect four outcomes: the number of true negatives, false negatives, true positives, and false positives.

The upper-left, N-N quadrant with a value of 196,583 represents the true negatives, or the number of pipes that the model predicts will not fail and the pipe did in fact not fail. The upper-right, N-Y quadrant with a value of 2123 represents the false negatives, or the number of pipes that the model predicts will not fail but the pipe actually failed. The lower-left, Y-N quadrant with a value of 60220 represents the false positives, or the number of pipes that the model predicted would fail but did not actually fail. The lower-right, Y-Y quadrant with a value of 6367 represents the true positives, or the number of pipes that the model predicted would fail and did in fact fail.

It can be seen that the logistic regression model is not as accurate compared to the random forest model. The logistic regression model has an overall accuracy 804 of roughly 76.5%. The logistic regression model's false positive and false negative rates are not that great either, and there are a lot of false positives and false negatives compared to the random forest model. This may suggest that pipe leaks are not a linear process since the logistic regression model is a linear model. Furthermore, the model's true positive rate, also referred to as the sensitivity 806, is 74.9% which corresponds to the model detecting 6,367 (or 74.9%) of the 8,490 pipe leaks. Accordingly, when prompted with the question of "will the pipe leak", the model will return an answer that is 74.9% accurate. The model's true negative rate, also referred to as the specificity 808, is 76.5% which corresponds to the model correctly determining 196,583 of the 256,803 pipes that did not leak. Accordingly, when prompted with the question of "will the pipe not leak", the model will return an answer that is 76.5% accurate.

Thus, based on these validation results shown in the confusion matrix, it can be seen that logistic regression model is not as accurate as the random forest model for predicting pipe leaks. In particular, this may indicate that there are nonlinearities in the pipe leak data since a linear model will outperform a nonlinear model if the underlying data is linear. However, this may be OK; the logistic regression model may be useful for enabling inference and determining relationships between the input variables, which can provide a perspective that cannot be obtained from the random forest model. For instance, the logistic regression model can be used to obtain the regression coefficients for each factor in the logistic regression model and the statistical significance of each factor.

FIG. 9 illustrates a list of coefficients for a logistic regression in accordance with embodiments of the present disclosure.

More specifically, the list of coefficients 902 for the logistic regression model can be used to enable inferences to be made on the various factors used in the logistic regression model. Any coefficient with a star next to it is something that is statistically significant, which means that it is unlikely to have occurred by random chance. For example, pipe-based factors such as the pipe diameter, the pipe length, the pipe thickness, max pressure rating, whether the pipe is made of HDPE or PVC, and percent life of the pipe are shown as statistically significant. Location-based factors such as soil resistivity, the geographic region of the pipe, the pipe elevation, and whether the pipe is in a hill are also shown as statistically significant.

For the pipe length, the standard error informs that the associated p-value is a very small number that is close to zero. More specifically, the pipe length is statistically significant as a factor at the 99 percentile level. Furthermore, the coefficient is positive which means that any increase in pipe length is associated with an increase in the odds of the pipe failing. This is useful information because the random forest model informed that pipe length is supremely important but it did not specify why. When both the random forest and logistic regression models agree on the same point, a more concrete framework is obtained. This information regarding pipe length means that pipes should be purchased that are shorter, even if it means that multiple pipes need to be purchased. Although this may incur a greater initial cost, it would greatly reduce the likelihood of the pipe's failure.

For the pipe diameter, the coefficient informs us that pipe diameter is negatively associated with a pipe failing. This means that as the pipe diameter increases the pipe is less likely to fail. In other words, wider pipes are less likely to fail, while thinner pipes are more likely to fail. This is useful information because a wider pipe may be more expensive initially, but it may be cheaper in the long run if the pipe is less likely to fail. For the pipe thickness, the coefficient is negative which means that thicker-walled pipes are less likely to fail than thinner pipes. This information may be useful because thicker-walled pipes might be more expensive, but less likely to fail, so it may make more sense to spend more upfront to use thicker-walled pipes.

The percent of life for the pipe is also important. As the pipe outlives its manufacturer recommended life, it is more likely to fail. This is common sense and confirms intuition. Surprisingly however, how the pipe is used is not statistically significant. This seems to agree with the random forest variable importance plot, and this agreement confirms the insights obtained from both models. These described inferences are not an exhaustive list of the inferences that can be drawn, but rather just a small subset of them. Numerous inferences can be drawn directly from the two models and will provide valuable information that can be used to confirm or validate previous assumptions in a concrete, mathematically-rigorous fashion.

Additional machine learning techniques or models can be used in order to obtain additional insights. For example, the combination of machine learning models may include a naïve bayes model that can also be used to generate inferences.

FIG. 10 illustrates a confusion matrix for a naïve bayes model in accordance with embodiments of the present disclosure.

With respect to the figure, an example confusion matrix 1002 is shown for a naïve bayes model generated based on the data illustrated in FIG. 4 (e.g., a dataset containing 265,293 pipes). The confusion matrix 1002 has four quadrants for comparing the predictions against the actual reference values: the upper-left, N-N quadrant with a value of 244,995; the upper-right, N-Y quadrant with a value of 5731; the lower-left, Y-N quadrant with a value of 11808; and the lower-right, Y-Y quadrant with a value of 2759. Similar to the confusion matrix of FIG. 5, these quadrants in the confusion matrix 1002 reflect four outcomes: the number of true negatives, false negatives, true positives, and false positives.

The upper-left, N-N quadrant with a value of 244,995 represents the true negatives, or the number of pipes that the model predicts will not fail and the pipe did in fact not fail. The upper-right, N-Y quadrant with a value of 5731 represents the false negatives, or the number of pipes that the model predicts will not fail but the pipe actually failed. The lower-left, Y-N quadrant with a value of 11,808 represents the false positives, or the number of pipes that the model predicted would fail but did not actually fail. The lower-right, Y-Y quadrant with a value of 2759 represents the true positives, or the number of pipes that the model predicted would fail and did in fact fail.

It can be seen that the naïve bayes model is not as accurate compared to the random forest model. The naïve bayes model has an overall accuracy 1004 of roughly 93.4%. The naïve bayes model's false positive and false negative rates are not that great either, and there are a lot of false positives and false negatives compared to the random forest model.

This may suggest that pipe leaks are not a linear process since the naïve bayes model is a linear model. Furthermore, the model's true positive rate, also referred to as the sensitivity 1006, is 32.5% which corresponds to the model detecting only 2759 (or 32.5%) of the 8,490 pipe leaks. Accordingly, when prompted with the question of "will the pipe leak", the model will return an answer that is 32.5% accurate. The model's true negative rate, also referred to as the specificity 1008, is 95.4% which corresponds to the model correctly determining 244,995 of the 256,803 pipes that did not leak. Accordingly, when prompted with the question of "will the pipe not leak", the model will return an answer that is 95.4% accurate. Thus, the naïve bayes model could be used to determine when a pipe will not leak with reasonable accuracy but should not be used to determine whether a pipe will leak.

Typically, a naïve bayes model may be used to serve as a baseline and not an optimal model, since it is usually very fast to train. This is because of the assumption used in the naïve bayes model that each of the 11 inputs (the same inputs used in the logistic regression and random forest) are independent of each other. If this is true, then the results of the naïve bayes model will be very accurate. If this assumption is not true, then the results of the model will not be accurate. Thus, by seeing how accurate or inaccurate the naïve bayes model is, we can draw the inference about how dependent the inputs are upon each other, which is a useful piece of information when combined with the insights from the random forest and logistic regression models. These results underperform both the logistic regression and the random forest models, which suggests that the independence of the factor variables (an assumption of the naïve bayes model) is not likely valid, and that there are complex interrelationships between these predictor variables themselves which are important enough to impact the predictive accuracy of the model. This insight means that any model which assigns weights to each of the factors individually is likely to be inaccurate.

Figure 11:
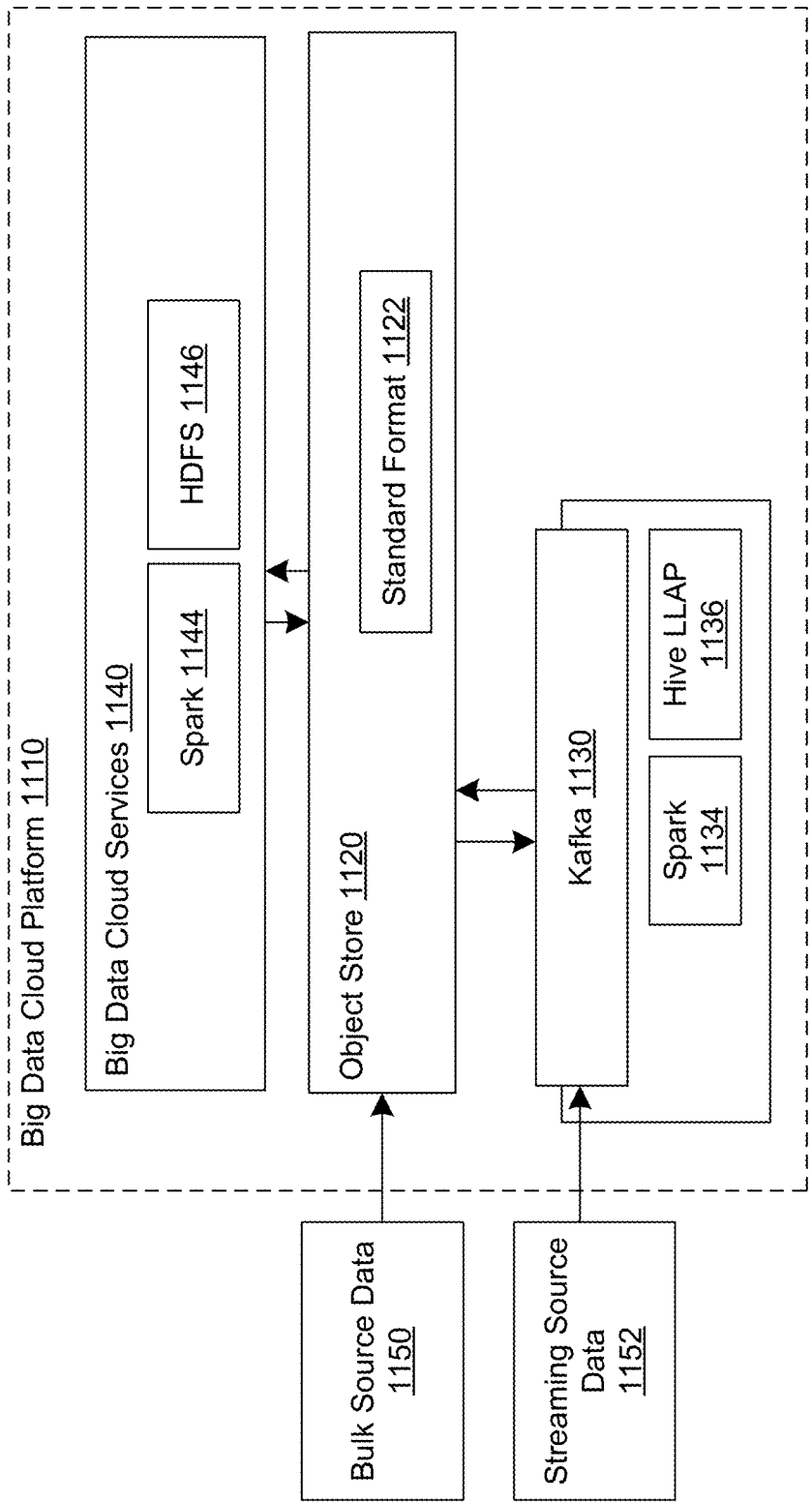
FIG. 11 illustrates a block diagram for implementing pipe leak prediction in accordance with embodiments of the present disclosure.

FIG. 11 illustrates a block diagram for implementing pipe leak prediction in accordance with embodiments of the present disclosure.

In some embodiments, the implementation solution for the pipe leak prediction system may involve a Big Data Cloud Platform 1110. In some embodiments, the Big Data Cloud Platform 1110 may store all pipe data (e.g., pipe characteristics and known leaks) in an Object Store 1120 under a Standard Format 1122.

In some embodiments, the Object Store 1120 may be maintained and provided through Big Data Cloud Service 1140, which can be a cloud computing service such as Amazon Simple Storage Service (S3). In some embodiments, Big Data Cloud Service 1140 may be implemented using Apache Hadoop, an open source software framework used for distributed storage and processing of large datasets. Big Data Cloud Service 1140 may be used to store all the data in the Object Store 1120. Thus, the data contained in the Object Store 1120 may be split up and stored in large blocks that are distributed across nodes in a computing cluster of the Big Data Cloud Service 1140. In some embodiments, Big Data Cloud Service 1140 may be implemented using HDFS (Hadoop Distributed File System) 1146, a Java-based filed system used to provide scalable and reliable data storage.

In some embodiments, the Big Data Cloud Service 1140 may utilize Spark 1144 (e.g., Apache Spark), which may provide a cluster-computing framework serving as a fast and general engine for big data processing via built-in modules for streaming data and machine learning. In other words, Spark 1144 may provide features for performing big data analytics using distributed processing of large data sets across clusters of computers and may improve upon the base Hadoop Map/Reduce technique for the distributed processing of large amounts of data. Spark 1144 may supercharge the native Hadoop Map/Reduce functionality by persisting in memory, whereas Map/Reduce persists to the disk. The result is that Spark 1144 can be 100 times faster than Map/Reduce in terms of memory operations and 10 times faster than Map/Reduce in terms of disk operations.

As shown in the figure, the Big Data Cloud Platform 1110 may receive Bulk Source Data 1150 and Streaming Source Data 1152. Generally, Bulk Source Data 1150 may include historical data such the characteristics of pipes out in the field and which of them have leaked, as well as the characteristics of pipes no longer in the field and which of them have leaked. In some embodiments, Bulk Source Data 1150 may be stored in the Object Store 1120, which may be referred to as a "data lake". All of the data stored in the Object Store 1120 may be uniformly stored in a Standard Format 1122. In some embodiments, the Standard Format 1122 can be (Hadoop Distributed File System) HDFS, a Java-based filed system used to provide scalable and reliable data storage.

The Streaming Source Data 1152 may include data for new pipes placed in the field (e.g., the characteristics of those pipes), as well as updates on which pipes have leaked. This data may be received in real-time (e.g., from field staff that are installing new pipes or checking on existing pipes for leaks). In some embodiments, field staff may enter this data on a computing device or mobile device out in the field, and that data will be received by the Big Data Cloud Platform 1110 to be integrated into the Object Store 1120. In some embodiments, the Streaming Source Data 1152 may be received at a communication interface, such Kafka 1130. As a communication interface, Kafka 1130 may receive the Streaming Source Data 1152 and parse out the individual messages in that data. Those messages can be converted into data that can be stored in the Object Store 1120 (e.g., in the Standard Format 1122). Thus, the Object Store 1120 may contain data from the Bulk Source Data 1150 (e.g., historical characteristics of existing pipes) and the Streaming Source Data 1152 (e.g., characteristics of new pipes or updates to historical characteristics of existing pipes) in the same uniform format.

In some embodiments, Spark 1134 and/or Hive LLAP 1136 are further used to analyze and process all of the data contained within the Object Store 1120 (e.g., in order to detect fraudulent behavior). Spark 1134 (e.g., Apache Spark) may provide a cluster-computing framework serving as a fast and general engine for big data processing via built-in modules for streaming data and machine learning. In other words, Spark 1134 may provide features for performing big data analytics using distributed processing of large data sets across clusters of computers and may improve upon the base Hadoop Map/Reduce technique for the distributed processing of large amounts of data. Spark 1134 may supercharge the native Hadoop Map/Reduce functionality by persisting in memory, whereas Map/Reduce persists to the disk. The result is that Spark 1134 can be 100 times faster than Map/Reduce in terms of memory operations and 10 times faster than Map/Reduce in terms of disk operations.

In some embodiments, Spark 1134 may include Oracle R Advanced Analytics for Hadoop (ORAAH), which may serve as a "supercharged" version of Spark that provides features for performing big data analytics using distributed processing of large data sets across clusters of computers. ORAAH may provide numerous advantages over the traditional Spark package. For instance, ORAAH may provide machine learning models (e.g., machine learning algorithms for classification, clustering, regression, feature extraction, etc.) that are 32 times faster than Spark. ORAAH may also provide the capability to deploy machine learning models developed in R&D into production. ORAAH may also provide the capability of executing R scripts directly in the data like. ORAAH may also serve as a single package that allows for reading/writing data from multiple data formats, including HDFS and/or HIVE. ORAAH may also be able to handle any formula present in R, whereas Spark may only be able to handle simple attributes with a limited subset of transformations.

In some embodiments, Hive LLAP 1136 may include Apache Hive, a data warehouse software project built on top of the Apache Hadoop platform for providing an SQL-like interface for data summarization, query, and analysis. Hive LLAP (Low Latency Analytical Processing) 1136 may build on the Hive architecture by providing faster SQL analytics. Thus, Kafka 1130 is used to parse and obtain messages from streaming data, which are then added to the historical data in the Object Store 1120. This "data lake" contained in the Object Store 1120 is processed using Spark 1134 and Hive LLAP 1136 in order to perform the steps for detecting electricity fraud that were previously described herein.

In some embodiments, the Object Store 1120 may be implemented in a manner that provides decoupled storage, a feature associated with an increase in computing efficiency and a reduction in the necessary computing resources. Hadoop typically consists of a combination of HDFS and MapReduce. However, the issue with HDFS is that the compute is on each node (e.g., clusters of a distributed computing system) and more nodes need to be added in order to obtain additional compute. Each node contains compute and storage which means that, by adding more nodes, storage is being effectively paid for that is not being used. As an alternative, a storage mechanism other than HDFS can be used, such as Amazon S3 or Oracle Object Storage. For instance, HDFS can be swapped out so that the system is implemented on a combination of Object Storage and MapReduce. Under this implementation, the storage is decoupled and nodes can be added with minimal storage, reducing the additional costs that would be associated with that storage. In other words, a service such as Oracle's Big Data Cloud Service—Compute Edition can be used to provision additional Hadoop or Spark clusters on demand, but the data itself is kept within Amazon S3 or Oracle Object Storage and is retrieved by the clusters when needed.

Figure 12:
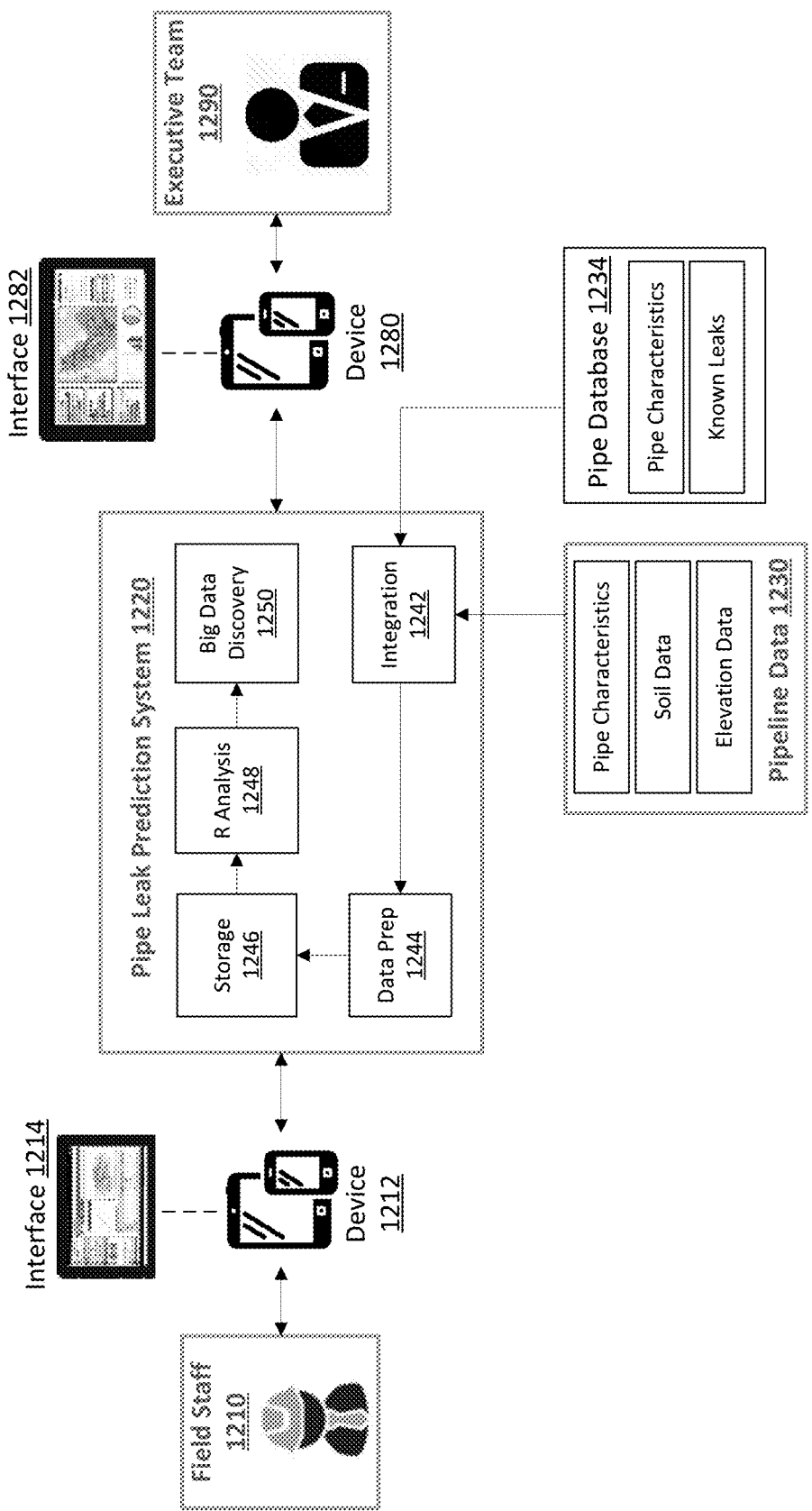
FIG. 12 illustrates a hybrid system diagram for pipe leak prediction in accordance with embodiments of the present disclosure.

FIG. 12 illustrates a hybrid system diagram for pipe leak prediction in accordance with embodiments of the present disclosure.

As shown in the figure, Pipe Leak Prediction System 1220 can access data from a Pipe Database 1234, which contains pipe characteristic data for pipes existing in the field and knowledge (e.g., known leaks) of which of those pipes have leaked in the past. This data is instrumental in building a model capable of predicting leaks in pipes. In addition, the Pipe Leak Prediction System 1220 may access Pipeline Data 1230, which may include new or updated pipe characteristics data for pipes in the field. The pipe characteristic data may be new in the case of newly installed pipes, and in some cases that new pipe characteristic data may be manually entered into the Pipe Leak Prediction System 1220 (e.g., by field staff 1210 or anyone installing the pipe). The Pipeline Data 1230 may also include environmental data obtained from sensors installed with, or around, the pipes in the field. For example, the Pipeline Data 1230 may include soil data, elevation data, weather data, and so forth, which may be obtained from soil or elevation sensors. The Pipe Leak Prediction System 1220 may apply the predictive model to the data in the Pipeline Data 1230 in order to output leak predictions about the pipes in the Pipeline Data 1230.

The Pipe Leak Prediction System 1220 may intake all of this data at block 1242. This may involve specialized communication interfaces (e.g., programming interfaces or APIs) configured for communicating with, and receiving data from any environmental sensors in the field. There may also be communication interfaces configured for communicating with, and receiving data from, any computer systems or devices storing the Pipe Database 1234. For instance, if Pipe Database 1234 is actually stored in a distributed manner over a cloud computing network, the Pipe Leak Prediction System 1220 may have communication interfaces for retrieving all of that data from the cloud computing network.

Once all of the data has been integrated within the Pipe Leak Prediction System 1220, at block 1244, the Pipe Leak Prediction System 1220 may convert all of the data into a singular, uniform format (e.g., making sure all the dates/times follow the same format). This allows the predictive model to be easily generated and applied (e.g., even if different field staff entering data for pipes have used different data formats or conventions).

At block 1246, the Pipe Leak Prediction System 1220 may store all of the data (e.g., the pipe characteristics data for all the pipes in existence) in storage, such as the Object Store 1120 shown in FIG. 11. At block 1248, the Pipe Leak Prediction System 1220 may perform R analysis on all of the data in the storage. For example, the Pipe Leak Prediction System 1220 may use data for known pipe leaks to calculate the relative impact of each variable, or pipe characteristic for which data is known, on the likelihood that any pipe will leak. At block 1250, the Pipe Leak Prediction System 1220 may predict the likelihood that each pipe in the field will leak (e.g., within a certain period of time) and identify the pipes that are most likely to leak or are likely to have already leaked.

Once the Pipe Leak Prediction System 1220 has identified the pipes that are most likely to leak or are likely to have already leaked, members of the Executive Team 1290 may be able to view reports on those identified pipes through an interface 1282 on a device 1280. The device 1280 may receive those reports generated from the Pipe Leak Prediction System 1220. Furthermore, the members of the Executive Team 1290 may be able to pull up and view the pipe leak predictions for any given pipe (e.g., based on an ID associated with the pipe), as well as a breakdown of the calculations used to generate those leak predictions. Thus, the members of the Executive Team 1290 may be able to further verify and confirm any leak predictions. For example, a member could notice that an extremely old pipe has been predicted to be likely to leak, which may make sense intuitively. That member could then directly indicate within the interface 1282 to instruct Field Staff 1210 to physically go to the pipe's location to inspect the pipe for any leaks.

The Device 1280 will then send the instruction to the Pipe Leak Prediction System 1220, which will then determine the closest Field Staff 1210 (e.g., geographically) to the pipe's location. If there are multiple pipes that need investigating, then the pipes may also be divided up amongst the field staff based on proximity (e.g., Field Staff 1210 may receive a pool of pipes for inspection that are in their geographic location). The Pipe Leak Prediction System 1220 may then forward the instruction to the Device 1212 associated with the Field Staff 1210. The Field Staff 1210 may be able to view the instruction and the pipe's location through Interface 1214 on the Device 1212. Afterwards, the Field Staff 1210 may then physically go to the pipe's location to investigate for any leads. The Field Staff 1210 may be able to indicate whether the pipe has already leaked through the Interface 1214 on the Device 1212. This information can be reported back to the Executive Team 1290, or it may be added to the existing data (e.g., stored by the Pipe Leak Prediction System 1220) in order to update or improve any existing predictive models for identifying pipe leaks.

Additional Implementation Details

Figure 13:
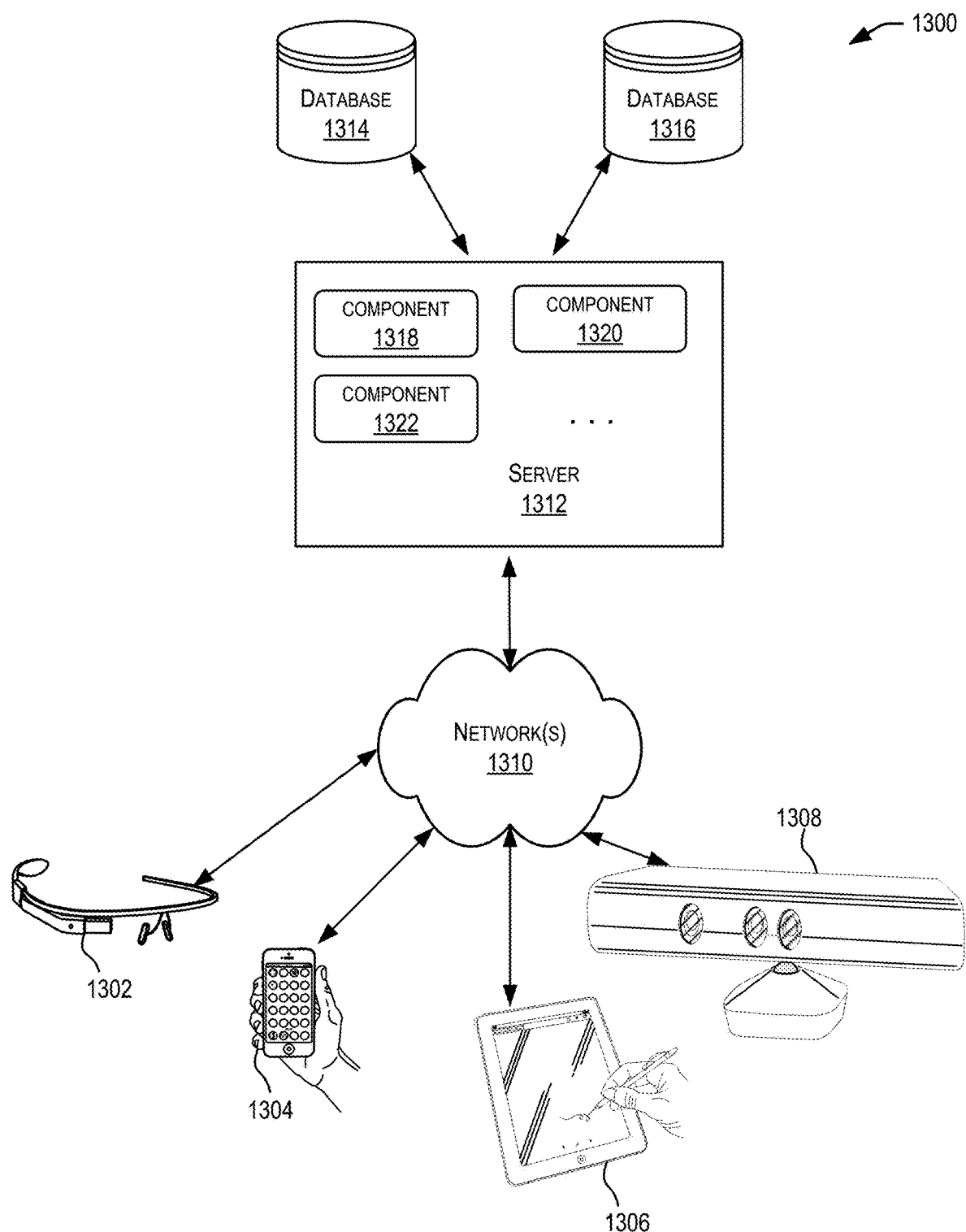
FIG. 13 depicts a simplified diagram of a distributed system for implementing one of the embodiments.

FIG. 13 depicts a simplified diagram of a distributed system 1300 for implementing one of the embodiments disclosed herein. The distributed system 1300 can implement embodiments of pipe leak prediction systems, as previously discussed. In the illustrated embodiment, distributed system 1300 includes one or more client computing devices 1302, 1304, 1306, and 1308, which are configured to execute and operate a client application such as a web browser, proprietary client (e.g., Oracle Forms), or the like over one or more network(s) 1310. Server 1312 may be communicatively coupled with remote client computing devices 1302, 1304, 1306, and 1308 via network 1310.

In various embodiments, server 1312 may be adapted to run one or more services or software applications provided by one or more of the components of the system. The services or software applications can include nonvirtual and virtual environments. Virtual environments can include those used for virtual events, tradeshows, simulators, classrooms, shopping exchanges, and enterprises, whether two- or three-dimensional (3D) representations, page-based logical environments, or otherwise. In some embodiments, these services may be offered as web-based or cloud services or under a Software as a Service (SaaS) model to the users of client computing devices 1302, 1304, 1306, and/or 1308. Users operating client computing devices 1302, 1304, 1306, and/or 1308 may in turn utilize one or more client applications to interact with server 1312 to utilize the services provided by these components.

In the configuration depicted in FIG. 13, the software components 1318, 1320 and 1322 of system 1300 are shown as being implemented on server 1312. In other embodiments, one or more of the components of system 1300 and/or the services provided by these components may also be implemented by one or more of the client computing devices 1302, 1304, 1306, and/or 1308. Users operating the client computing devices may then utilize one or more client applications to use the services provided by these components. These components may be implemented in hardware, firmware, software, or combinations thereof. It should be appreciated that various different system configurations are possible, which may be different from distributed system 1300. The embodiment shown in FIG. 13 is thus one example of a distributed system for implementing an embodiment system and is not intended to be limiting.

Client computing devices 1302, 1304, 1306, and/or 1308 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1302, 1304, 1306, and 1308 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1310.

Although exemplary distributed system 1300 is shown with four client computing devices, any number of client computing devices may be supported. Other devices, such as devices with sensors, etc., may interact with server 1312.

Network(s) 1310 in distributed system 1300 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1310 can be a local area network (LAN), such as one based on Ethernet, Token-Ring and/or the like. Network(s) 1310 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1312 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1312 can include one or more virtual machines running virtual operating systems, or other computing architectures involving virtualization. One or more flexible pools of logical storage devices can be virtualized to maintain virtual storage devices for the server. Virtual networks can be controlled by server 1312 using software defined networking. In various embodiments, server 1312 may be adapted to run one or more services or software applications described in the foregoing disclosure. For example, server 1312 may correspond to a server for performing processing described above according to an embodiment of the present disclosure.

Server 1312 may run an operating system including any of those discussed above, as well as any commercially available server operating system. Server 1312 may also run any of a variety of additional server applications and/or mid-tier applications, including HTTP servers, FTP servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1312 may include one or more applications to analyze and consolidate data feeds and/or event updates received from users of client computing devices 1302, 1304, 1306, and 1308. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1312 may also include one or more applications to display the data feeds and/or real-time events via one or more display devices of client computing devices 1302, 1304, 1306, and 1308.

Distributed system 1300 may also include one or more databases 1314 and 1316. Databases 1314 and 1316 may reside in a variety of locations. By way of example, one or more of databases 1314 and 1316 may reside on a non-transitory storage medium local to (and/or resident in) server 1312. Alternatively, databases 1314 and 1316 may be remote from server 1312 and in communication with server 1312 via a network-based or dedicated connection. In one set of embodiments, databases 1314 and 1316 may reside in a storage-area network (SAN). Similarly, any necessary files for performing the functions attributed to server 1312 may be stored locally on server 1312 and/or remotely, as appropriate. In one set of embodiments, databases 1314 and 1316 may include relational databases, such as databases provided by Oracle, that are adapted to store, update, and retrieve data in response to SQL-formatted commands.

Figure 14:
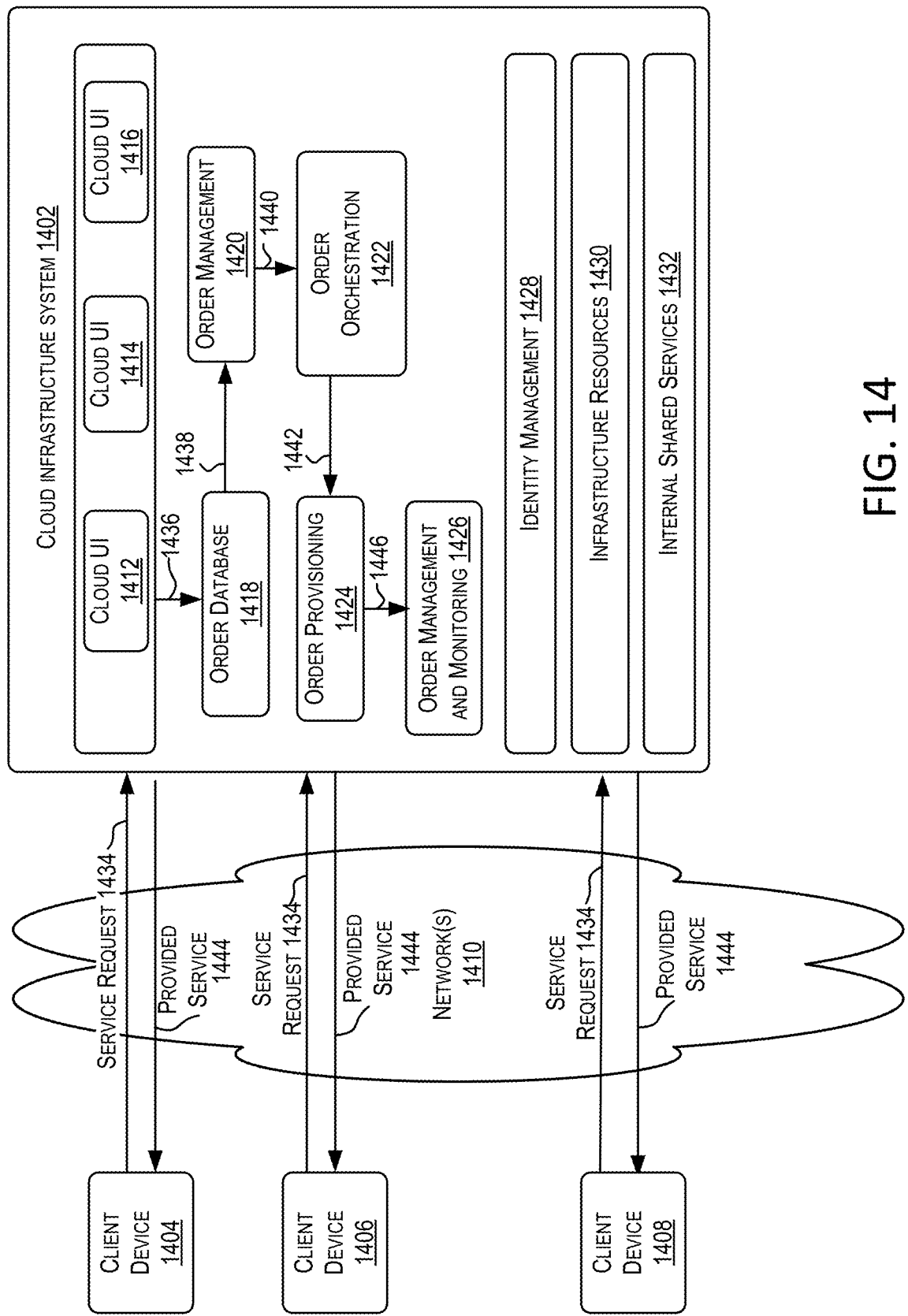
FIG. 14 is a simplified block diagram of components of a system environment by which services provided by the components of an embodiment system may be offered as cloud services, in accordance with an embodiment of the present disclosure.

FIG. 14 is a simplified block diagram of one or more components of a system environment 1400 by which services provided by one or more components of an embodiment system may be offered as cloud services, in accordance with an embodiment of the present disclosure. The system environment 1400 can include or implement embodiments of pipe leak prediction systems as previously described. In the illustrated embodiment, system environment 1400 includes one or more client computing devices 1404, 1406, and 1408 that may be used by users to interact with a cloud infrastructure system 1402 that provides cloud services. The client computing devices may be configured to operate a client application such as a web browser, a proprietary client application (e.g., Oracle Forms), or some other application, which may be used by a user of the client computing device to interact with cloud infrastructure system 1402 to use services provided by cloud infrastructure system 1402.

It should be appreciated that cloud infrastructure system 1402 depicted in FIG. 14 may have other components than those depicted. Further, the embodiment shown in FIG. 14 is only one example of a cloud infrastructure system that may incorporate an embodiment of the invention. For example, the cloud infrastructure system 1402 can include or implement one or more elements of the pipe leak prediction systems as previously described. In some other embodiments, cloud infrastructure system 1402 may have more or fewer components than shown in FIG. 14, may combine two or more components, or may have a different configuration or arrangement of components.

Client computing devices 1404, 1406, and 1408 may be devices similar to those described above for 1302, 1304, 1306, and 1308.

Although exemplary system environment 1400 is shown with three client computing devices, any number of client computing devices may be supported. Other devices such as devices with sensors, etc. may interact with cloud infrastructure system 1402.

Network(s) 1410 may facilitate communications and exchange of data between clients 1404, 1406, and 1408 and cloud infrastructure system 1402. Each network may be any type of network familiar to those skilled in the art that can support data communications using any of a variety of commercially-available protocols, including those described above for network(s) 1310.

Cloud infrastructure system 1402 may comprise one or more computers and/or servers that may include those described above for server 1312.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1402 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 1402 may be adapted to automatically provision, manage and track a customer's subscription to services offered by cloud infrastructure system 1402. Cloud infrastructure system 1402 may provide the cloud services via different deployment models. For example, services may be provided under a public cloud model in which cloud infrastructure system 1402 is owned by an organization selling cloud services (e.g., owned by Oracle) and the services are made available to the general public or different industry enterprises. As another example, services may be provided under a private cloud model in which cloud infrastructure system 1402 is operated solely for a single organization and may provide services for one or more entities within the organization. The cloud services may also be provided under a community cloud model in which cloud infrastructure system 1402 and the services provided by cloud infrastructure system 1402 are shared by several organizations in a related community. The cloud services may also be provided under a hybrid cloud model, which is a combination of two or more different models.

In some embodiments, the services provided by cloud infrastructure system 1402 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1402. Cloud infrastructure system 1402 then performs processing to provide the services in the customer's subscription order.

In some embodiments, the services provided by cloud infrastructure system 1402 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1402 may also include infrastructure resources 1430 for providing the resources used to provide various services to customers of the cloud infrastructure system. In one embodiment, infrastructure resources 1430 may include pre-integrated and optimized combinations of hardware, such as servers, storage, and networking resources to execute the services provided by the PaaS platform and the SaaS platform.

In some embodiments, resources in cloud infrastructure system 1402 may be shared by multiple users and dynamically re-allocated per demand. Additionally, resources may be allocated to users in different time zones. For example, cloud infrastructure system 1430 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1432 may be provided that are shared by different components or modules of cloud infrastructure system 1402 and by the services provided by cloud infrastructure system 1402. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1402 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1402, and the like.

In one embodiment, as depicted in FIG. 14, cloud management functionality may be provided by one or more modules, such as an order management module 1420, an order orchestration module 1422, an order provisioning module 1424, an order management and monitoring module 1426, and an identity management module 1428. These modules may include or be provided using one or more computers and/or servers, which may be general purpose computers, specialized server computers, server farms, server clusters, or any other appropriate arrangement and/or combination.

In exemplary operation 1434, a customer using a client device, such as client device 1404, 1406 or 1408, may interact with cloud infrastructure system 1402 by requesting one or more services provided by cloud infrastructure system 1402 and placing an order for a subscription for one or more services offered by cloud infrastructure system 1402. In certain embodiments, the customer may access a cloud User Interface (UI), cloud UI 1412, cloud UI 1414 and/or cloud UI 1416 and place a subscription order via these UIs. The order information received by cloud infrastructure system 1402 in response to the customer placing an order may include information identifying the customer and one or more services offered by the cloud infrastructure system 1402 that the customer intends to subscribe to.

After an order has been placed by the customer, the order information is received via the cloud UIs, 1412, 1414 and/or 1416.

At operation 1436, the order is stored in order database 1418. Order database 1418 can be one of several databases operated by cloud infrastructure system 1418 and operated in conjunction with other system elements.

At operation 1438, the order information is forwarded to an order management module 1420. In some instances, order management module 1420 may be configured to perform billing and accounting functions related to the order, such as verifying the order, and upon verification, booking the order.

At operation 1440, information regarding the order is communicated to an order orchestration module 1422. Order orchestration module 1422 may utilize the order information to orchestrate the provisioning of services and resources for the order placed by the customer. In some instances, order orchestration module 1422 may orchestrate the provisioning of resources to support the subscribed services using the services of order provisioning module 1424.

In certain embodiments, order orchestration module 1422 enables the management of business processes associated with each order and applies business logic to determine whether an order should proceed to provisioning. At operation 1442, upon receiving an order for a new subscription, order orchestration module 1422 sends a request to order provisioning module 1424 to allocate resources and configure those resources needed to fulfill the subscription order. Order provisioning module 1424 enables the allocation of resources for the services ordered by the customer. Order provisioning module 1424 provides a level of abstraction between the cloud services provided by cloud infrastructure system 1400 and the physical implementation layer that is used to provision the resources for providing the requested services. Order orchestration module 1422 may thus be isolated from implementation details, such as whether or not services and resources are actually provisioned on the fly or pre-provisioned and only allocated/assigned upon request.

At operation 1444, once the services and resources are provisioned, a notification of the provided service may be sent to customers on client devices 1404, 1406 and/or 1408 by order provisioning module 1424 of cloud infrastructure system 1402.

At operation 1446, the customer's subscription order may be managed and tracked by an order management and monitoring module 1426. In some instances, order management and monitoring module 1426 may be configured to collect usage statistics for the services in the subscription order, such as the amount of storage used, the amount data transferred, the number of users, and the amount of system up time and system down time.

In certain embodiments, cloud infrastructure system 1400 may include an identity management module 1428. Identity management module 1428 may be configured to provide identity services, such as access management and authorization services in cloud infrastructure system 1400. In some embodiments, identity management module 1428 may control information about customers who wish to utilize the services provided by cloud infrastructure system 1402. Such information can include information that authenticates the identities of such customers and information that describes which actions those customers are authorized to perform relative to various system resources (e.g., files, directories, applications, communication ports, memory segments, etc.). Identity management module 1428 may also include the management of descriptive information about each customer and about how and by whom that descriptive information can be accessed and modified.

Figure 15:
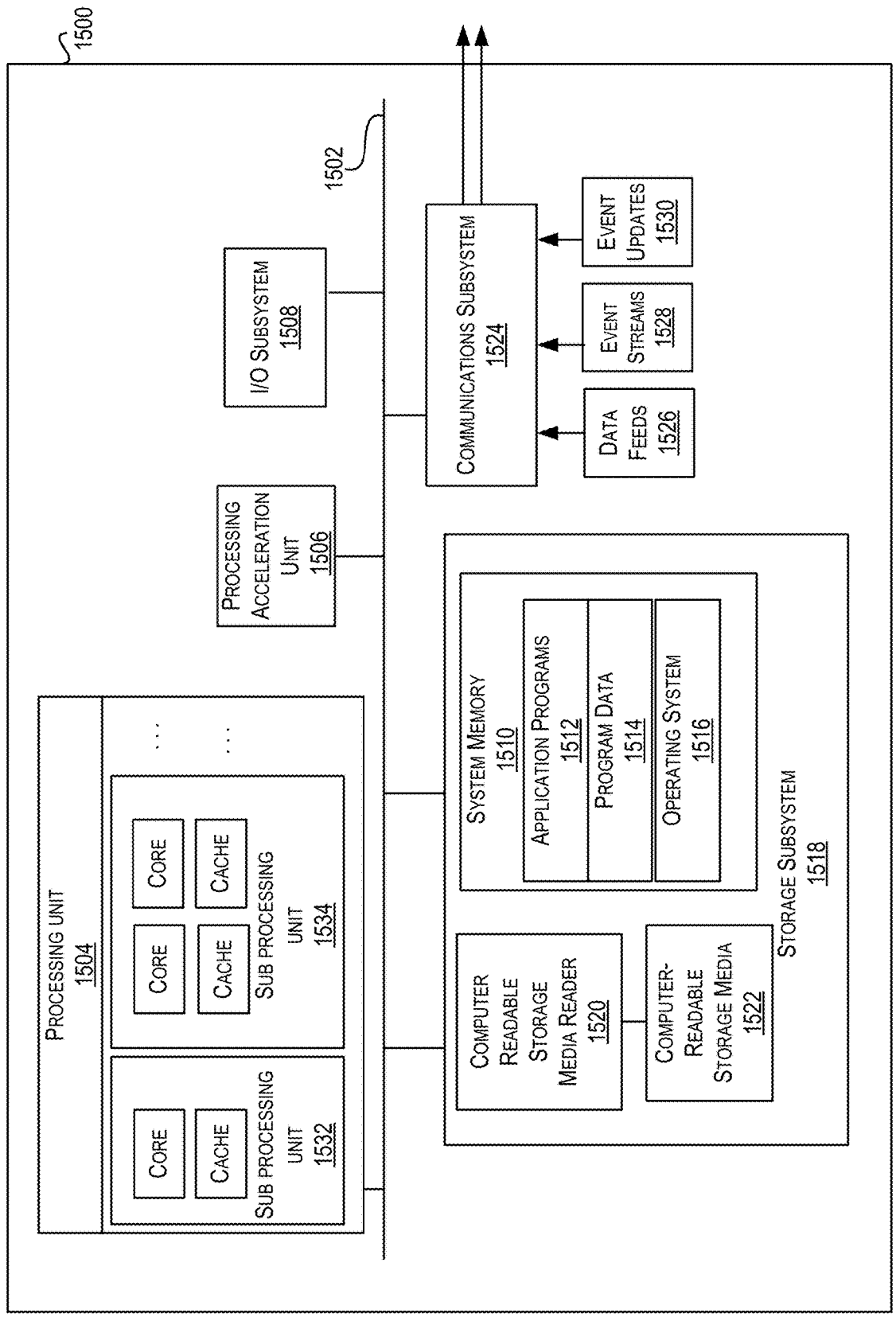
FIG. 15 illustrates an exemplary computer system, in which various embodiments of the present invention may be implemented.

FIG. 15 illustrates an exemplary computer system 1500, in which various embodiments of the present invention may be implemented. The system 1500 may be used to implement any of the computer systems described above. For example, all or some of the elements of the pipe leak prediction system illustrated in FIG. 1 can be included or implemented in the system 1500. As shown in FIG. 15, computer system 1500 includes a processing unit 1504 that communicates with a number of peripheral subsystems via a bus subsystem 1502. These peripheral subsystems may include a processing acceleration unit 1506, an I/O subsystem 1508, a storage subsystem 1518 and a communications subsystem 1524. Storage subsystem 1518 includes tangible computer-readable storage media 1522 and a system memory 1510.

Bus subsystem 1502 provides a mechanism for letting the various components and subsystems of computer system 1500 communicate with each other as intended. Although bus subsystem 1502 is shown schematically as a single bus, alternative embodiments of the bus subsystem may utilize multiple buses. Bus subsystem 1502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1504, which can be implemented as one or more integrated circuits (e.g., a conventional microprocessor or microcontroller), controls the operation of computer system 1500. One or more processors may be included in processing unit 1504. These processors may include single core or multicore processors. In certain embodiments, processing unit 1504 may be implemented as one or more independent processing units 1532 and/or 1534 with single or multicore processors included in each processing unit. In other embodiments, processing unit 1504 may also be implemented as a quad-core processing unit formed by integrating two dual-core processors into a single chip.

In various embodiments, processing unit 1504 can execute a variety of programs in response to program code and can maintain multiple concurrently executing programs or processes. At any given time, some or all of the program code to be executed can be resident in processor(s) 1504 and/or in storage subsystem 1518. Through suitable programming, processor(s) 1504 can provide various functionalities described above. Computer system 1500 may additionally include a processing acceleration unit 1506, which can include a digital signal processor (DSP), a special-purpose processor, and/or the like.

I/O subsystem 1508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1500 may comprise a storage subsystem 1518 that comprises software elements, shown as being currently located within a system memory 1510. System memory 1510 may store program instructions that are loadable and executable on processing unit 1504, as well as data generated during the execution of these programs.

Depending on the configuration and type of computer system 1500, system memory 1510 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1504. In some implementations, system memory 1510 may include multiple different types of memory, such as static random access memory (SRAM) or dynamic random access memory (DRAM). In some implementations, a basic input/output system (BIOS), containing the basic routines that help to transfer information between elements within computer system 1500, such as during start-up, may typically be stored in the ROM. By way of example, and not limitation, system memory 1510 also illustrates application programs 1512, which may include client applications, Web browsers, mid-tier applications, relational database management systems (RDBMS), etc., program data 1514, and an operating system 1516. By way of example, operating system 1516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1518 may also provide a tangible computer-readable storage medium for storing the basic programming and data constructs that provide the functionality of some embodiments. Software (programs, code modules, instructions) that when executed by a processor provide the functionality described above may be stored in storage subsystem 1518. These software modules or instructions may be executed by processing unit 1504. Storage subsystem 1518 may also provide a repository for storing data used in accordance with the present invention.

Storage subsystem 1500 may also include a computer-readable storage media reader 1520 that can further be connected to computer-readable storage media 1522. Together and, optionally, in combination with system memory 1510, computer-readable storage media 1522 may comprehensively represent remote, local, fixed, and/or removable storage devices plus storage media for temporarily and/or more permanently containing, storing, transmitting, and retrieving computer-readable information.

Computer-readable storage media 1522 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 1500.

By way of example, computer-readable storage media 1522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1522 may include, but is not limited to, Zip® drives, flash memory cards, universal serial bus (USB) flash drives, secure digital (SD) cards, DVD disks, digital video tape, and the like. Computer-readable storage media 1522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1500.

Communications subsystem 1524 provides an interface to other computer systems and networks. Communications subsystem 1524 serves as an interface for receiving data from and transmitting data to other systems from computer system 1500. For example, communications subsystem 1524 may enable computer system 1500 to connect to one or more devices via the Internet. In some embodiments communications subsystem 1524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1524 can provide wired network connectivity (e.g., Ethernet) in addition to or instead of a wireless interface.

In some embodiments, communications subsystem 1524 may also receive input communication in the form of structured and/or unstructured data feeds 1526, event streams 1528, event updates 1530, and the like on behalf of one or more users who may use computer system 1500.

By way of example, communications subsystem 1524 may be configured to receive data feeds 1526 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 1524 may also be configured to receive data in the form of continuous data streams, which may include event streams 1528 of real-time events and/or event updates 1530, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1524 may also be configured to output the structured and/or unstructured data feeds 1526, event streams 1528, event updates 1530, and the like to one or more databases that may be in communication with one or more streaming data source computers coupled to computer system 1500.

Computer system 1500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1500 depicted in FIG. 15 is intended only as a specific example. Many other configurations having more or fewer components than the system depicted in FIG. 15 are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method for predicting pipe leaks, the method comprising:
   accessing a training dataset including first data items and known leaks associated with respective pipes of a first plurality of pipes, wherein the first data items include characteristics of the respective pipes, wherein the characteristics of the respective pipes include only lengths of the first plurality of pipes, soil resistivity at the first plurality of pipes, pressure rating of the first plurality of pipes, and elevation of the first plurality of pipes;
   applying a supervised machine learning technique to generate a predictive model configured to determine a leak prediction of a pipe by training the predictive model based on the first data items associated with respective pipes of the first plurality of pipes;
   accessing a validation dataset including second data items and known leaks associated with respective pipes of a second plurality of pipes, wherein the second data items include characteristics of the respective pipes;
   validating the predictive model by at least:

determining a set of leak predictions of the pipes of the second plurality of pipes by applying the predictive model to the second data items;
comparing the leak predictions of the pipes of the second plurality of pipes with known leaks of the pipes of the second plurality of pipes to determine an accuracy of the leak predictions of the pipes of the second plurality of pipes;
generating a confusion matrix based on the accuracy of the leak predictions of the pipes of the second plurality of pipes;
determining, based on the confusion matrix, a true positive rate, false positive rate, true negative rate, and false negative rate associated, with the accuracy of the leak predictions of the pipes of the second plurality of pipes,
determining that the true positive rate is above a first threshold value; and
determining that the true negative rate is above a second threshold value;
accessing a pipeline dataset including third data items associated with a third plurality of pipes; and
applying the predictive model to the pipeline dataset to determine leak predictions of respective pipes of the third plurality of pipes.

2. The computer-implemented method of claim 1, wherein the predictive model includes a random forest model.

3. The computer-implemented method of claim 1, wherein the predictive model includes a logistic regression.

4. The computer-implemented method of claim 1, wherein the predictive model includes a naïve Bayes model.

5. The computer-implemented method of claim 1, wherein the first threshold value is automatically determined based on a statistical distribution of the set of leak predictions of the pipes of the second plurality of pipes from applying the predictive model.

6. The computer-implemented method of claim 1, wherein the second threshold value is automatically determined based on a statistical distribution of the set of leak predictions of the pipes of the second plurality of pipes from applying the predictive model.

7. The computer-implemented method of claim 1, wherein the method further comprises:
ordering the pipes of the third plurality of pipes based on the determined leak predictions of the pipes of the third plurality of pipes.

8. A computing system comprising: one or more data stores storing:
a training dataset including first data items and known leaks associated with respective pipes of a first plurality of pipes, wherein the first data items include characteristics of the respective pipes, wherein the characteristics of the respective pipes include only lengths of the first plurality of pipes, soil resistivity at the first plurality of pipes, pressure rating of the first plurality of pipes, and elevation of the first plurality of pipes;
a validation dataset including second data items and known leaks associated with respective pipes of a second plurality of pipes, wherein the second data items include characteristics of the respective pipes:
a computer processor: and
a computer readable storage medium storing program instructions configured for execution by the computer processor in order to cause the computer processor to:
access the training dataset;
apply a supervised machine learning technique to generate a predictive model configured to determine a leak prediction of a pipe by training the predictive model based on the first data items associated with respective pipes of the first plurality of pipes;
access the validation dataset;
validate the predictive model by at least:
determining a set of leak predictions of the pipes of the second plurality of pipes by applying the predictive model to the second data items;
comparing the leak predictions of the pipes of the second plurality of pipes with known leaks of the pipes of the second plurality of pipes to determine an accuracy of the leak predictions of the pipes of the second plurality of pipes;
generating a confusion matrix based on the accuracy of the leak predictions of the pipes of the second plurality of pipes;
determining, based on the confusion matrix, a true positive rate, a false positive rate, a true negative rate, and a false negative rate associated with the accuracy of the leak predictions of the pipes of the second plurality of pipes;
determining that the true positive rate is above a first threshold value; and
determining that the true negative rate is above a second threshold value;
access a pipeline dataset including third data items associated with a third plurality of pipes; and
apply the predictive model to the pipeline dataset to determine leak predictions of respective pipes of the third plurality of pipes.

9. The computing system of claim 8, wherein the predictive model includes a random forest model.

10. The computing system of claim 8, wherein the predictive model includes a logistic regression.

11. The computing system of claim 8, wherein the predictive model includes a naïve Bayes model.

12. The computing system of claim 8, wherein the first threshold value is automatically determined based on a statistical distribution of the set of leak predictions of the pipes of the second plurality of pipes from applying the predictive model.

13. The computing system of claim 8, wherein the second threshold value is automatically determined based on a statistical distribution of the set of leak predictions of the pipes of the second plurality of pipes from applying the predictive model.

14. The computing system of claim 8, wherein the program instructions, when executed by the computer processor, further cause the computer processor to:
order the pipes of the third plurality of pipes based on the determined leak predictions of the pipes of the third plurality of pipes.

15. A non-transitory computer-readable medium containing program instructions configured for execution by a computer processor in order to cause the computer processor to:
access a training dataset included in one or more data stores, the training dataset including first data items and known leaks associated with respective pipes of a first plurality of pipes, wherein the first data items include characteristics of the respective pipes, wherein the characteristics of the respective pipes include only lengths of the first plurality of pipes, soil resistivity at the first plurality of pipes, pressure rating of the first plurality of pipes, and elevation of the first plurality of pipes;

apply a supervised machine learning technique to generate a predictive model configured to determine a leak prediction of a pipe by training the predictive model based on the first data items associated with respective pipes of the first plurality of pipes;

access a validation dataset included in the one or more data stores, the validation dataset including second data items and known leaks associated with respective pipes of a second plurality of pipes, wherein the second data items include characteristics of the respective pipes;

validate the predictive model by at least:
  determining a set of leak predictions of the pipes of the second plurality of pipes by applying the predictive model to the second data items;
  comparing the leak predictions of the pipes of the second plurality of pipes with known teaks of the pipes of the second plurality of pipes to determine an accuracy of the leak predictions of the pipes of the second plurality of pipes;
  generating a confusion matrix based on the accuracy of the teak predictions of the pipes of the second plurality of pipes;
  determining, based on the confusion matrix, a true positive rate, a false positive rate, a true negative rate, and a false negative rate associated with the accuracy of the leak predictions of the pipes of the second plurality of pipes;
  determining that the true positive rate is above a first threshold value; and
  determining that the true negative rate is above a second threshold value;

access a pipeline dataset including third data items associated with a third plurality of pipes; and apply the predictive model to the pipeline dataset to determine leak predictions of respective pipes of the third plurality of pipes.

16. The non-transitory computer-readable medium of claim 15, wherein the predictive model includes a random forest model.

17. The non-transitory computer-readable medium of claim 15, wherein the predictive model includes a logistic regression.

18. The non-transitory computer-readable medium of claim 15, wherein the predictive model includes a naïve Bayes model.

19. The non-transitory computer-readable medium of claim 15, wherein the first threshold value is automatically determined based on a statistical distribution of the set of leak predictions of the pipes of the second plurality of pipes from applying the predictive model.

20. The non-transitory computer-readable medium of claim 15, wherein the second threshold value is automatically determined based on a statistical distribution of the set of leak predictions of the pipes of the second plurality of pipes from applying the predictive model.

* * * * *

UNITED STATES PATENT AND TRADEMARK OFFICE
CERTIFICATE OF CORRECTION

PATENT NO. : 11,373,105 B2  
APPLICATION NO. : 15/820316  
DATED : June 28, 2022  
INVENTOR(S) : Hussain Abbas It is certified that error appears in the above-identified patent and that said Letters Patent is hereby corrected as shown below:

On the Title Page

On page 2, Column 2, under Other Publications, Line 11, delete "TechnicalMeeting" and insert -- Technical Meeting --, therefor.

On page 2, Column 2, under Other Publications, Line 13, delete "w ith" and insert -- with --, therefor.

On page 2, Column 2, under Other Publications, Line 17, delete "Netw orks," and insert -- Networks, --, therefor.

In the Specification

In Column 31, Line 47, delete "evolution)," and insert -- evolution)), --, therefor.

In the Claims

In Column 35, Line 19, in Claim 15, delete "teaks" and insert -- leaks --, therefor.

In Column 35, Line 24, in Claim 15, delete "teak" and insert -- leak --, therefor.

Signed and Sealed this  
Twenty-seventh Day of December, 2022

Katherine Kelly Vidal  
*Director of the United States Patent and Trademark Office*